(12) United States Patent
Byeon et al.

(10) Patent No.: US 11,895,286 B2
(45) Date of Patent: Feb. 6, 2024

(54) DEVICE AND METHOD FOR TRANSMITTING DATA OF MULTIPLE APPLICATIONS WITH LOW LATENCY

(71) Applicant: Samsung Electronics Co., Ltd., Suwon-si (KR)

(72) Inventors: Kwangmin Byeon, Suwon-si (KR); Seungbum Lee, Suwon-si (KR); Seungseok Hong, Suwon-si (KR); Minki Kim, Suwon-si (KR); Hyunsoo Kim, Suwon-si (KR); Donghyun Yeom, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 232 days.

(21) Appl. No.: 17/550,270

(22) Filed: Dec. 14, 2021

(65) Prior Publication Data

US 2022/0191457 A1 Jun. 16, 2022

Related U.S. Application Data

(63) Continuation of application No. PCT/KR2021/017742, filed on Nov. 29, 2021.

(30) Foreign Application Priority Data

Dec. 16, 2020 (KR) .................. 10-2020-0176751

(51) Int. Cl.
*H04N 13/167* (2018.01)
*H04N 13/383* (2018.01)
*H04N 13/293* (2018.01)

(52) U.S. Cl.
CPC ......... *H04N 13/167* (2018.05); *H04N 13/293* (2018.05); *H04N 13/383* (2018.05)

(58) Field of Classification Search
CPC .. H04N 13/167; H04N 13/293; H04N 13/383; H04N 13/156; H04N 13/194;
(Continued)

(56) References Cited

U.S. PATENT DOCUMENTS 10,248,192 B2   4/2019  Lehman et al.
2008/0024597 A1 1/2008  Yang et al.
(Continued)

FOREIGN PATENT DOCUMENTS

KR   10-2008-0010502 A   1/2008
KR   10-2016-0024487 A   3/2016
(Continued)

OTHER PUBLICATIONS

Search Report dated Mar. 7, 2022 in PCT/KR2021/017742 and English-language translation (6 pages).
(Continued)

*Primary Examiner* — Farzana Hossain
(74) *Attorney, Agent, or Firm* — Nixon & Vanderhye, P.C.

(57) ABSTRACT

Various embodiments of the present disclosure provide an electronic device comprising: a communication module comprising communication circuitry, a memory, and a processor operatively connected to the communication module and the memory, wherein the processor is configured to: control the electronic device to establish a connection to a wearable display device through the communication module, receive gaze information from the wearable display device, determine a first application and a second application corresponding to the gaze information to be displayed on a screen, identify profiles of the determined first application and second application, and combine graphic data corresponding to the first application and graphic data corresponding to the second application and transmit the combined graphic data to the wearable display device, or transmit each of graphic data corresponding to the first application and graphic data corresponding to the second application to the wearable display device, based on the identified profiles.

15 Claims, 14 Drawing Sheets

(58) Field of Classification Search
CPC ...... H04N 13/332; H04N 23/90; G06F 3/017; G06F 3/0304; G06F 3/013; G06T 19/00; G06T 19/006; G06V 20/20; G06V 40/19; H04L 65/40; H04L 67/04; H04L 67/30; H04L 67/60
See application file for complete search history.

(56) References Cited

U.S. PATENT DOCUMENTS

| | | |
|---|---|---|
| 2012/0194419 A1 | 8/2012 | Osterhout et al. |
| 2015/0084857 A1 | 3/2015 | Kimura |
| 2016/0062116 A1 | 3/2016 | Ham et al. |
| 2018/0077451 A1 | 3/2018 | Yip et al. |
| 2018/0279006 A1 | 9/2018 | Cole et al. |
| 2019/0073831 A1 | 3/2019 | Kim |
| 2019/0101980 A1* | 4/2019 | Stafford ................. G02C 11/10 |

FOREIGN PATENT DOCUMENTS

| | | |
|---|---|---|
| KR | 10-2017-0090490 A | 8/2017 |
| KR | 10-1941789 | 1/2019 |
| KR | 10-2019-0121280 | 10/2019 |
| KR | 10-2020-0066419 A | 6/2020 |

OTHER PUBLICATIONS

Written Opinion dated Mar. 7, 2022 in PCT/KR2021/017742 and English-language translation (6 pages).

\* cited by examiner

DEVICE AND METHOD FOR TRANSMITTING DATA OF MULTIPLE APPLICATIONS WITH LOW LATENCY

CROSS-REFERENCE TO RELATED APPLICATIONS

This application is a continuation of International Application No. PCT/KR2021/017742 designating the United States, filed on Nov. 29, 2021, in the Korean Intellectual Property Receiving Office and claiming priority to Korean Patent Application No. 10-2020-0176751, filed on Dec. 16, 2020, in the Korean Intellectual Property Office, the disclosures of which are incorporated by reference herein in their entireties.

BACKGROUND

Field

The disclosure relates to a method and a device for transmitting graphic data of multiple applications to a wearable display device (e.g., AR glasses) by an electronic device.

Description of Related Art

With the development of digital technology, various types of electronic devices such as a mobile communication terminal, a personal digital assistant (PDA), an electronic scheduler, a smartphone, a tablet personal computer (PC), a wearable display device have been widely used. The electronic devices, as described above, are continuously improved in hardware parts and/or software parts in order to support and increase functions thereof.

For example, the electronic devices may be connected to a wearable display device, a wireless audio output device (e.g., earphone or headphone), a laptop by means of short-range wireless communication such as Bluetooth and Wi-Fi direct, so as to output or exchange information (or content). For example, the electronic devices may be connected to a wireless audio output device via short-range communication so as to output sounds of a music or a video through the wireless audio output device. The wearable display device may include AR glasses, smart glasses, or a head-mounted device (e.g., a head-mounted display (HMD)). The electronic devices may be connected to the wearable display device to output various contents, to which expended reality (XR) technology such as virtual reality (VR), augmented reality (AR), and/or mixed reality (MR) is applied, through the wearable display device. For example, the wearable display device may overlap (or overlay) various digital contents (e.g., virtual image) onto the real world and provide the same as a single image.

The wearable display device may be worn on an area closest to eyes of a user, and thus usability may decrease when a delay of displaying data through glasses occurs. The wearable display device may receive graphic data from the electronic devices and display the same on glasses, and the conventional technology of screen sharing between the electronic devices and the wearable display device may correspond to composing of multiple pieces of graphic data into one piece of graphic data and transmitting the same. Since multiple pieces of graphic data are composed into one piece of graphic data and transmitted, when one piece of graphic data requires additional data processing for security issues, the other pieces of graphic data requiring no additional data processing may not be transmitted while additional data processing is performed for the one piece of graphic data. In this case, a delay according to graphic data transmission may occur in the electronic devices, and thus a delay in displaying graphic data by the wearable display device may occur.

SUMMARY

Embodiments of the disclosure provide a method and device for minimizing and/or reducing a display delay of graphic data in a wearable display device, wherein when graphic data for multiple applications is transmitted from an electronic device to the wearable display device, according to whether the graphic data requires additional data processing, multiple pieces of graphic data requiring no additional data processing may be combined into one and transmitted, and graphic data requiring additional data processing may be individually transmitted.

An electronic device according to various example embodiments of the disclosure may include: a communication module comprising communication circuitry, a memory, and a processor operatively connected to the communication module and the memory, wherein the processor is configured to: control the electronic device to establish a connection to a wearable display device through the communication module, receive gaze information from the wearable display device, determine a first application and a second application corresponding to the gaze information to be displayed on a screen, identify profiles of the determined first application and second application, and combine graphic data corresponding to the first application and graphic data corresponding to the second application and transmit the combined data to the wearable display device, or transmit each of graphic data corresponding to the first application and graphic data corresponding to the second application to the wearable display device, based on the identified profiles.

An electronic device according to various example embodiments of the disclosure may include: a communication module comprising communication circuitry, a memory, a display module including a display, and a processor operatively connected to the communication module, the memory, and the display module, wherein the processor is configured to: control the electronic device establish a connection to an external electronic device through the communication module, track a gaze, transmit the tracked gaze information to the external electronic device, receive first graphic data corresponding to a first application and second graphic data corresponding to a second application from the external electronic device, display the first graphic data on the display module, and perform additional data processing for the second graphic data and display the processed second graphic data on the display module.

A method of operating an electronic device according to various example embodiments of the disclosure may include: receiving gaze information from a wearable display device in a state in which a connection to the wearable display device is made through a communication module of the electronic device, determining a first application and a second application corresponding to the gaze information to be displayed on a screen, identifying profiles of the determined first application and second application, and combining graphic data corresponding to the first application and graphic data corresponding to the second application and transmitting the combined graphic data to the wearable display device, or transmitting each of graphic data corresponding to the first application and graphic data corresponding to the second application to the wearable display device, based on the identified profiles.

According to various example embodiments, when graphic data for multiple applications is transmitted, graphic data requiring additional data processing and graphic data requiring no additional data processing are separately transmitted, whereby a delay in displaying graphic data in a wearable display device can be minimized and/or reduced.

According to various example embodiments, a gaze of a user wearing a wearable display device may be tracked, graphic data of an application, which is to be transmitted, may be determined based on the gaze of the user, and multiple pieces of graphic data may be arranged or combined into one piece of graphic data and transmitted, or each graphic data may be individually transmitted, based on at least one of a priority, protection or non-protection indication, or a category configured in the determined application.

According to various example embodiments, graphic data requiring protection and graphic data requiring no protection are separately transmitted based on a profile of an application, whereby low-latency data transmission can be secured, and a stable transmission environment can be provided while graphic data requiring protection can be protected.

According to various example embodiments, while maintaining low-latency transmission is maintained and a seamless display environment is provided, graphic data requiring protection can be stably transmitted with substantially no latency.

According to various example embodiments, transmission data according to transmission of graphic data of an application included in a gaze of a user is reduced, and a network with an external device of an application not included in the gaze of the user is temporarily changed to a sleep mode, whereby consumption current can be reduced.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
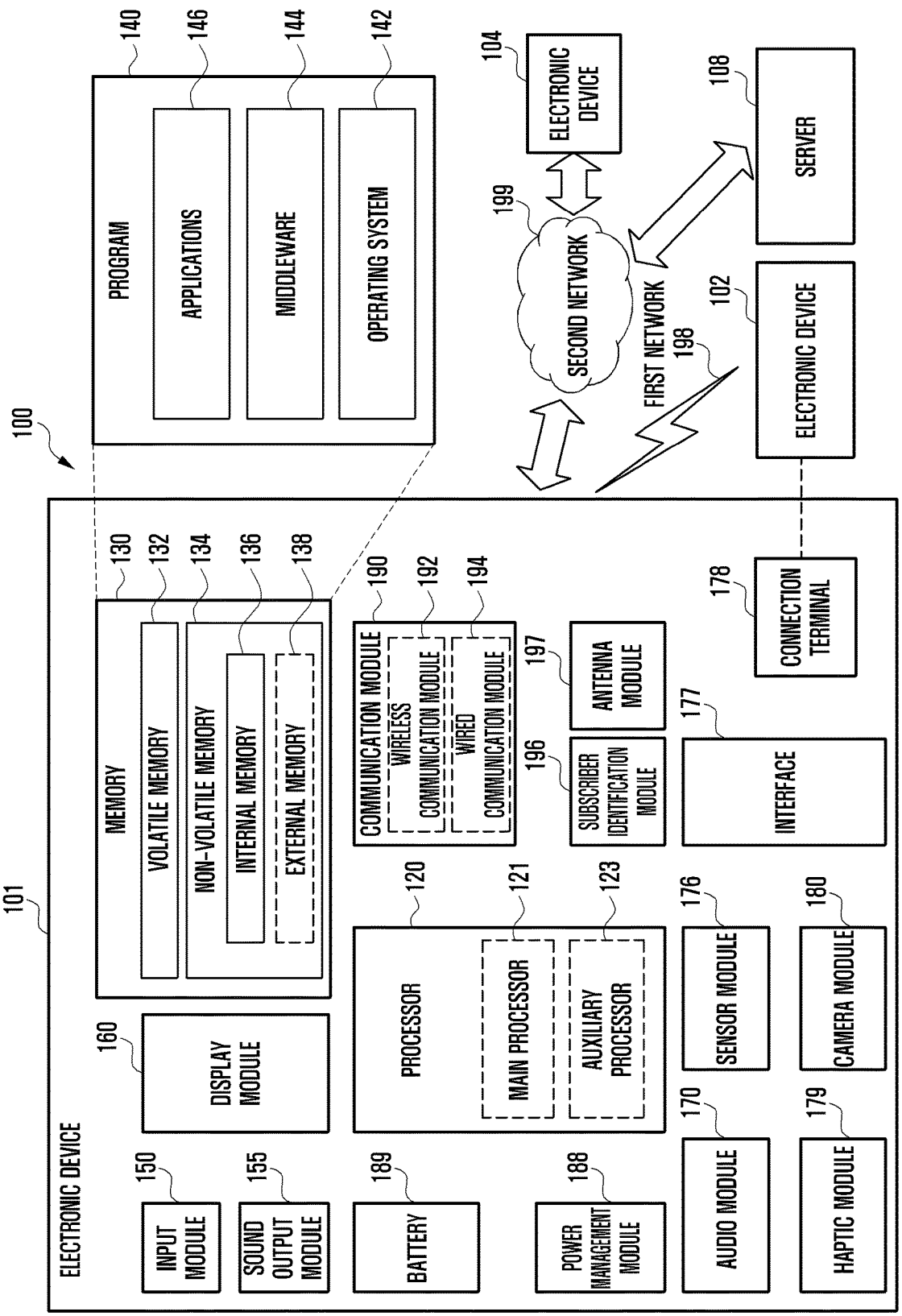
FIG. 1 is a block diagram illustrating an example electronic device in a network environment according to various embodiments.

The electronic device according to various embodiments may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
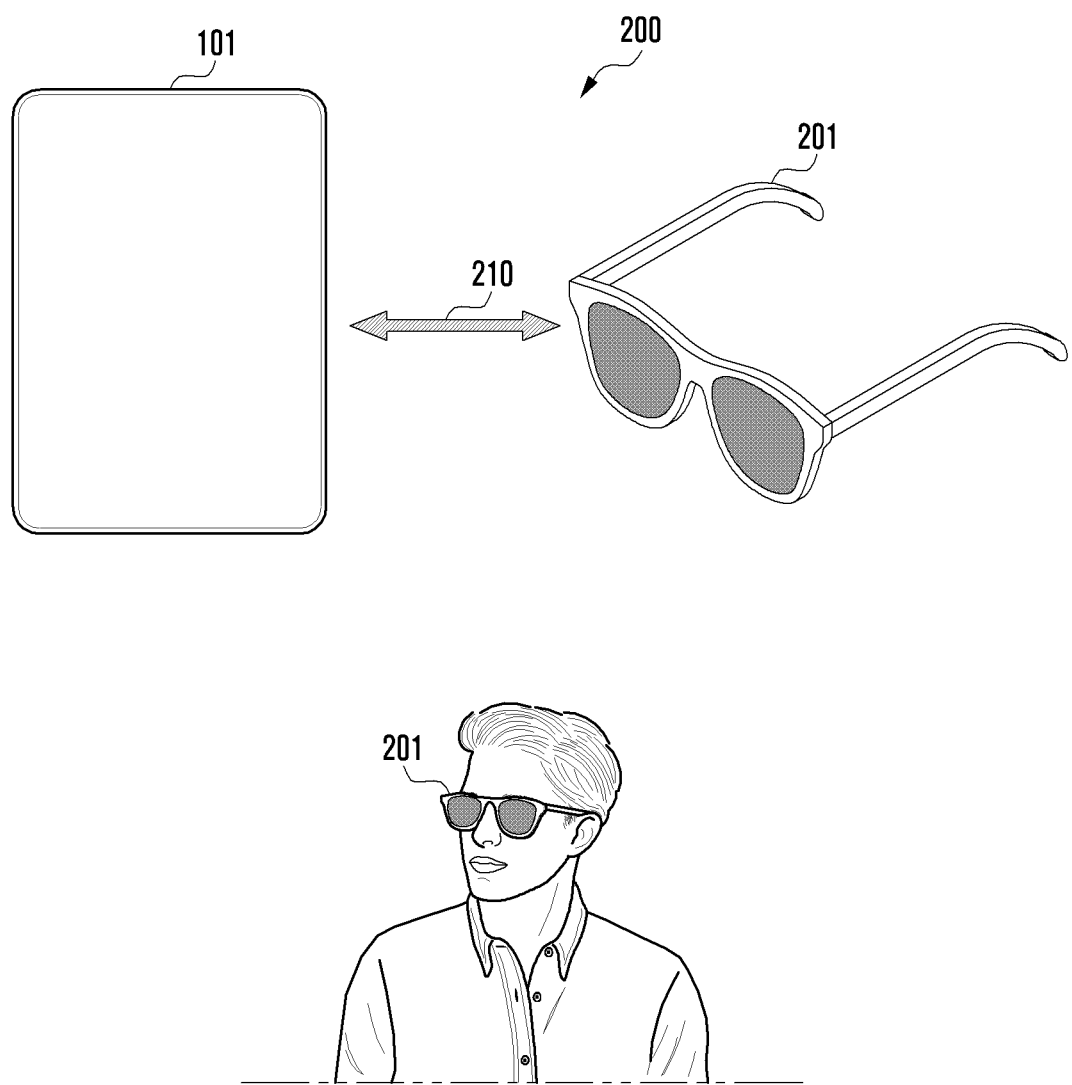
FIG. 2 is a diagram illustrating an example network environment between a wearable display device and an electronic device according to various embodiments.

FIG. 2 is a diagram illustrating an example network environment between a wearable display device and an electronic device according to various embodiments.

Referring to FIG. 2, an electronic device (e.g., the electronic device 101 of FIG. 1) according to various embodiments may be connected 200 to a wearable display device 201. The electronic device 101 and the wearable display device 201 may be wiredly connected to each other or wirelessly paired with each other. For example, the electronic device 101 may be connected to the wearable display device 201 through short-range wireless communication 210 such as Bluetooth, low-power Bluetooth, Wi-Fi, Wi-Fi direct, or an ultra-wideband (UWB). A method for pairing devices corresponds to a related art, and thus detailed description thereof may be omitted. According to various embodiments, the electronic device 101 may include a smartphone, a tablet personal computer (PC), and/or a laptop computer (notebook). The wearable display device 201 may include AR glasses, smart glasses, or a head-mounted device (e.g., head-mounted display (HMD)).

The wearable display device 201 may directly generate (e.g., perform generation based on stored or processed data) related data (e.g., an AR image) for an AR or a VR service or acquire the same from the outside (e.g., the electronic device 101 or a server (e.g., the server 108 of FIG. 1)), so as to display the same through a display (not shown). For example, the wearable display device 201 is wearable on the body (e.g., face) of a user, and may display an image (e.g., AR screen) through the display by overlapping various digital contents (e.g., AR images) onto the real world. According to an embodiment, the wearable display device 201 may receive image data (e.g., AR image) from the electronic device 101 and display the received image data through the display together with real-world data.

According to an embodiment, when the wearable display device 201 is communicatively connected to the electronic device 101, the wearable display device 201 periodically transmits information on an image captured through a camera (not shown) of the wearable display device 201 and gaze information (e.g., a field of view (FOV) or an angle of view (AOV)) of a user, to the electronic device 101, and/or may transmit a change (e.g., a change in the location or the direction) in the state of the wearable display device 201 to the electronic device 101 when the change occurs. According to an embodiment, when the wearable display device 201 is communicatively connected to the electronic device 101, the wearable display device 201 may provide (e.g., transmit) at least one piece of information such as image information, gaze information, device information, sensing information, functional information, and/or location information, to the electronic device 101.

According to various embodiments, the electronic device 101 may combine, process or arrange multiple pieces of graphic data and transmit the composite (as used herein, the term "composed" may refer to combining, processing or arranging multiple pieces of data and the term "composite data" may refer to the data so arranged or combined) data, or may transmit each of the multiple pieces of graphic data, based on the gaze information of a user wearing the wearable display device 201 and a profile of each application. For example, the electronic device 101 may determine, based on the user gaze information, at least two applications among graphic data pieces corresponding to multiple applications. The profile of an application may be configured by an application developer and may include, for example, at least one of a priority, protection or non-protection indication, or a category. The electronic device 101 may identify (or determine), based on the profile of the application, whether graphic data corresponding to an application requires additional data processing (e.g., whether graphic data requires additional processing (e.g., protect) or requires no additional processing (e.g., non-protect)).

According to various embodiments, the priority of the application may be divided into "high" (or 3), "medium" (or 2), and "low" (or 1). An application having a "high" priority may correspond to an application (e.g., finance), the screen of which needs to be prioritized for data protection, regardless of latency. An application having a "medium" priority does not so much require low latency, and may be thus an application, the transmission environment of which is flexibly changeable according to a network or an external environment. An application having a "low" priority may correspond to an application (e.g., game) requiring low latency for prompt feedback.

When the priority is "high", individual transmission may be possible, when the priority is "medium", composite or individual transmission may be possible, and when the priority is "low", only composite transmission may be possible. For example, when the priority is "high", individual transmission may be determined regardless of the protection or non-protection indication of the application. Alternatively, when the priority is "medium", composite transmission or individual transmission may be determined according to the protection or non-protection indication of the application. When the priority is "low", composite transmission may be determined regardless of the protection or non-protection indication of the application. When the priority is "high" or "medium", composite or individual transmission may be possible, and when the priority is "low, only composite transmission may be possible. This is merely an implementation issue, and the disclosure is not limited to the description above.

According to various embodiments, the protection or non-protection indication of the application may be divided into "true" (or 0) and "false" (or 1). When the protection or non-protection indication corresponds to "true", individual transmission may be possible, and when the protection or non-protection indication corresponds to "false", only composite transmission may be possible. For example, when no protection or non-protection indication is configured by the developer of the application, the protection or non-protection indication may be configured as "false". A category of the application may include, for example, and without limitation, at least one of a phone call, social (e.g., message or messenger), a social network service (SNS), a video (e.g., video reproducing), a game, an audio (e.g., audio reproducing), navigation, a map, Internet, finance, or the like. When the category is configured as "finance", individual transmission may be possible, and composite transmission or individual transmission may be possible for the other categories. The category of the application is an example for assisting in understanding of the disclosure, and there may be more or less categories. The disclosure is not limited to the description above.

According to various embodiments, among profiles of two determined applications, when an application requiring additional data processing is included, the electronic device 101 may determine to transmit respective graphic data corresponding to the applications. Among profiles of two determined applications, when an application requiring additional data processing is not included, the electronic device 101 may determine to compose graphic data corresponding to the applications and transmit same. The application requiring additional data processing may refer, for example, to an application requiring an additional data processing work when graphic data is displayed or transmitted. The additional data processing work corresponds to, for example, an operation (e.g., high-bandwidth digital content protection (HDCP)) of performing encryption according to content protection, and may refer, for example, to an operation except for a preprocessing operation corresponding to encoding or packetizing which is generally performed when the electronic device 101 displays or transmits graphic data. To assist in understanding of the disclosure, the HDCP is described as an example, but the additional data processing work is not limited thereto. The electronic device 101 may include an identifier in graphic data corresponding to an application requiring additional data processing when transmitting the same. The identifier may be included in a head field of a packet. The wearable display device 201 may identify whether the graphic data requires additional data processing, based on the profile of the application.

When additional data processing work is required, it may refer, for example, to it taking more time for the electronic device 101 to transmit graphic data to the wearable display device 201 due to the additional data processing work. In this case, transmission delay may occur according to the additional data processing work. Among the graphic data to be transmitted, when there is graphic data requiring additional data processing work, the electronic device 101 may not compose the graphic data and another graphic data, but rather transmit the graphic data requiring no additional data processing work first, and then transmit graphic data, for which the additional data processing work has been performed, later. For example, when the electronic device 101 needs to transmit first graphic data corresponding to a first application and second graphic data corresponding to a second application and one of the first graphic data and the second graphic data requires additional data processing work, the electronic device 101 may first preprocess the first graphic data requiring no additional data processing work, and may perform preprocessing and additional data processing for the second graphic data and then transmit the same. When neither the first graphic data nor the second graphic data requires the additional data processing work, the electronic device 101 may compose and preprocess the first graphic data and the second graphic data, and transmit the same.

According to various embodiments, a part of the first graphic data may require additional data processing, but the other part of the first graphic data may require no additional data processing. The electronic device 101 may divide the first graphic data into one part requiring additional data processing and the other part requiring no additional data processing and transmit the same. For example, the electronic device 101 may preprocess (e.g., performing encoding or packetizing) the second graphic data and the other part of the first graphic data requiring no additional data processing, and transmit the same, and may perform preprocessing and additional data processing (e.g., encoding, encryption, or packetizing) for the one part of the first graphic data requiring additional data processing and then transmit the same to the wearable display device 201.

According to various embodiments, the electronic device 101 may classify a communication channel into a communication channel for the individual transmission and a communication channel for the composite transmission. For example, in a case of the communication channel for the individual transmission, a transmission speed may be faster or a transmission bandwidth may be wider compared to a case of the communication channel for the composite transmission, in consideration of a time delay due to additional data processing. The electronic device 101 may configure a user datagram protocol (UDP), a transmission protocol, a bandwidth, a transmission thread priority, and whether to activate a retransmission process in a case of transmission failure, based on the individual transmission or the composite transmission, so as to use a communication channel.

According to various embodiments, the electronic device 101 may divide a communication channel according to a priority of an application. For example, when the priority of the application is "high", the electronic device 101 may configure a first communication channel which has a UDP-based transmission protocol or a stable transmission bandwidth, or activates a retransmission process in a case of transmission failure. When the priority of the application is "medium", the electronic device 101 may configure a second communication channel which has a UDP-based transmission protocol, a variable transmission bandwidth, or a medium transmission thread priority. When the priority of the application is "low", the electronic device 101 may configure a third communication channel which has a UDP-based transmission protocol, a high transmission bandwidth, or a top transmission thread priority, or deactivates a retransmission process in a case of transmission failure.

According to various embodiments, the wearable display device 201 may display graphic data according to a sequence of receiving the graphic data from the electronic device 101. For example, in a case in which the wearable display device 201 needs to display first graphic data and second graphic data according the gaze of the user, when the first graphic data and the second graphic data are composed into one piece of graphic data and received from the electronic device 101, the wearable display device 201 may depacketize and decode the one piece of graphic data obtained by composing the first graphic data and the second graphic data and display the same. The depacketizing and decoding may refer, for example, to a preprocessing operation generally performed to display received graphic data. The wearable display device 201 may preprocess multiple pieces of graphic data, which does not require additional data processing other than the preprocessing operation, in the same manner as the conventional manner, and display the same. When each of the first graphic data and the second graphic data is received from the electronic device 101, the wearable display device 201 may preprocess (e.g., depacketize and decode) the first graphic data that is received earlier, and display the same, and may perform preprocessing and additional data processing for the second graphic data that is received later, and display the same. The additional data processing operation may correspond to an operation (e.g., HDCP) of decrypting encrypted contents and may refer, for example, to an operation except for a preprocessing operation of depacketizing and decoding performed when processing the received graphic data.

Figure 3:
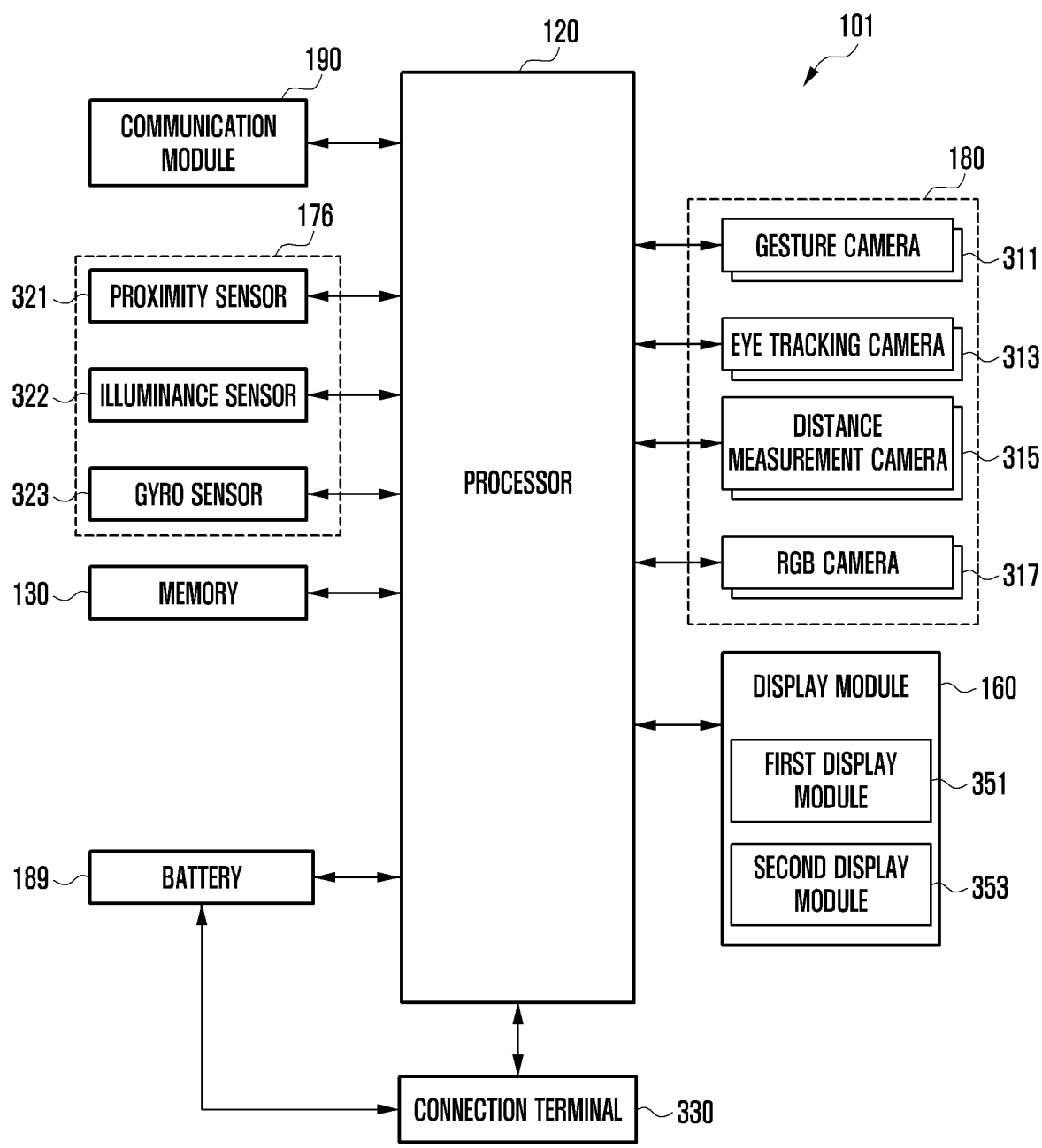
FIG. 3 is a block diagram illustrating an example configuration of an electronic device according to various embodiments.

FIG. 3 is a block diagram illustrating an example configuration of an electronic device according to various embodiments.

An example of configuration related to supporting for an AR or VR service by an electronic device (e.g., the electronic device 101 of FIG. 1) according to various embodiments may be illustrated. According to an embodiment, the electronic device 101 illustrated in FIG. 3 may include all or at least some of the elements of the electronic device 101 in the description with reference to FIG. 1. According to an embodiment, FIG. 3 illustrates an example in which the electronic device 101 corresponds to the wearable display device 201.

Referring to FIG. 3, the electronic device 101 may include a processor (e.g., including processing circuitry) 120 (e.g., the processor 120 of FIG. 1), a memory 130 (e.g., the memory 130 of FIG. 1), a display module (e.g., including a display) 160 (e.g., the display module 160 of FIG. 1), a sensor module (e.g., including a sensor) 176 (e.g., the sensor module 176 of FIG. 1), a camera module (e.g., including a camera) 180 (e.g., the camera module 180), a battery 189 (e.g., the battery 189 of FIG. 1), and/or a communication module (e.g., including communication circuitry) 190 (e.g., the communication module 190 of FIG. 1). According to an embodiment, the electronic device 101 may be connected to an external electronic device (not shown) through a connection terminal 330 (e.g., USB TYPE-C). For example, the electronic device 101 may receive power from the external electronic device through the connection terminal 330 and charge the battery 189.

According to an embodiment, the elements included in the electronic device 101 may be understood as, for example, a hardware module (e.g., circuitry). The elements of the electronic device 101 illustrated in FIG. 3 may be omitted, or replaced with other elements, or additional elements may be added thereto. For example, a first display module 351 and a second display module 353 may be included when the electronic device 101 corresponds to the wearable display device 201, and may not be included when the electronic device 101 corresponds to a smartphone.

According to an embodiment, the processor 120 may include various processing circuitry and execute a program (e.g., the program 140 of FIG. 1) stored in the memory 130 to control at least one other element (e.g., hardware or software element), and may perform various data processing or computation. According to an embodiment, the processor 120 may provide an augmented reality service to a user. The processor 120 may output at least one virtual object through the display module 160 so that the at least one virtual object is to be shown as overlapping onto an actual space corresponding to a gaze (e.g., FOV or AOV) of a user wearing the electronic device 101.

According to an embodiment, the display module 160 of the electronic device 101 may include a display including at least one glass. According to an embodiment, a first glass includes at least a part of the first display module 351 and a second glass may include at least a part of the second display module 353. For example, each of the first display module 351 and/or the second display module 353 may be included in a display panel. The display panel may include transparent elements so that a user can recognize an actual space through the display module 160. The display module 160 may display at least one virtual object on at least a part of the display panel so that a virtual object is shown, to the user wearing the electronic device 101, as overlapping onto the actual space.

According to various embodiments, the first display module 351 and/or the second display module 353 may include a condensing lens and/or a transparent waveguide. For example, the transparent waveguide may be at least partially located in the part of the first display module 351 and/or the second display module 353. According to an embodiment, the first display module 351 and/or the second display module 353 may receive emitted light and allow the emitted light to be transferred to the user through a waveguide and/or a wave path (e.g., waveguide) formed in the first display module 351 and/or the second display module 353. The waveguide may be made of glass or polymer, and may include a nano pattern formed on one internal or external surface thereof, for example, a polygonal or curved-shaped grating structure. According to an embodiment, the emitted light may be spread or reflected within the waveguide and may be transferred to the user.

For example, the gaze of the user may include an angle and/or a range in which the user can recognize a thing (e.g., an object). According to an embodiment, the display module 160 may include the first display module 351 corresponding to the left eye of both eyes of the user and the second display module 353 corresponding to the right eye. According to an embodiment, the processor 120 may load configuration information related to the performance (e.g., resolution, a frame rate, the size of a display area, and/or sharpness) of the display module 160 from the memory 130, and may adjust the performance of the display module 160, based on the configuration information.

According to an embodiment, the sensor module 176 of the electronic device 101 may include various sensors, including, for example, a proximity sensor 321, an illuminance sensor 322, and/or a gyro sensor 323. According to an embodiment, the proximity sensor 321 may detect an object becoming adjacent to the electronic device 101. The illuminance sensor 322 may measure the degree of brightness around the electronic device 101. According to an embodiment, the processor 120 may identify the degree of brightness around the electronic device 101 by using the illuminance sensor 322, and may change configuration information related to the brightness of the display module 160, based on the degree of brightness. For example, when the degree of brightness of the electronic device 101 is higher than a preconfigured degree of brightness, the processor 120 may configure a higher degree of brightness of the display module 160 to increase visibility of the user. According to an embodiment, the gyro sensor 323 may detect the posture and the position of the electronic device 101. For example, the gyro sensor 323 may detect whether the electronic device 101 is properly worn on the head of the user. In another example, the gyro sensor 323 may detect the movement of the electronic device 101 or the user wearing the electronic device 101.

According to an embodiment, the electronic device 101 may perform wireless communication with another electronic device (e.g., the electronic device 102 or 104 of FIG. 1) through the communication module 190 (e.g., a wireless communication circuit). For example, the electronic device 101 and a portable electronic device (e.g., a smartphone) may perform wireless communication, and may exchange an instruction and/or data with each other. According to an embodiment, the electronic device 101 may be at least partially controlled by another external electronic device (e.g., a portable electronic device). For example, the electronic device 101 may perform at least one function under the control of another external electronic device.

According to various embodiments, the electronic device 101 may transmit information on the distance from an object positioned in an actual space, information on the gaze of the user, and information on a gesture of the user to another electronic device through a camera (e.g., the camera module 180 of FIG. 1) of the electronic device 101. According to an embodiment, the camera module 180 of the electronic device 101 may include various cameras, including, for example, a gesture camera 311, an eye tracking camera 313, a distance measurement camera (depth camera) 315, and/or a red-green-blue (RGB) camera 317.

According to an embodiment, the gesture camera 311 may detect the movement of the user. For example, one or more gesture cameras 311 may be arranged in the electronic device 101, and the gesture camera 311 may detect the movement of a user's hand within a preconfigured distance. The gesture camera 311 may include a simultaneous localization and mapping (SLAM) camera for recognizing information (e.g., the position and/or the direction) related to a space around the electronic device 101. A gesture recognition area of the gesture camera 311 may be configured based on a capture range of the gesture camera 311.

According to an embodiment, the eye tracking camera 313 may track movements of the left eye and the right eye of the user. According to an embodiment, the processor 120 may identify the gaze direction of the left eye and the gaze direction of the right eye (e.g., gaze information of the user) by using the eye tracking camera 313. For example, the eye tracking camera 313 may include a first eye tracking camera (not shown) for identifying the gaze direction of the left eye and a second eye tracking camera (not shown) for identifying the gaze direction of the right eye. According to an embodiment, the distance measurement camera 315 may measure the distance from an object positioned in front of the electronic device 101. The distance measurement camera 315 may include a time of flight (TOF) camera and/or a depth camera. According to an embodiment, the distance measurement camera 315 may capture an image in the front direction of the electronic device 101, and the eye tracking camera 313 may capture an image in the direction opposite to the image capturing direction of the distance measurement camera 315.

According to an embodiment, the electronic device 101 may measure the distance from an object using the distance measurement camera 315. According to an embodiment, the electronic device 101 may recognize one of objects positioned in the gaze direction (e.g., FOV) in which the user gazes, by means of the eye tracking camera 313, and may calculate the depth through a depth camera according the distance from the corresponding object, or may measure a distance through a TOF camera according to the distance from the corresponding object. According to an embodiment, the RGB camera 317 may detect information related to the color of an object and information on the distance from an object. According to an embodiment, the electronic device 101 may include one type of a camera by integrating the distance measurement camera 315 and the RGB camera 317. According to an embodiment, each of the gesture camera 311, the eye tracking camera 313, the distance measurement camera 315, and/or the RGB camera 317 included in the camera module 180 may be included in the electronic device 101, or some of the gesture camera 311, the eye tracking camera 313, the distance measurement camera 315, and/or the RGB camera 317 may be implemented as one integrated camera. For example, the distance measurement camera 315 and the RGB camera 317 may be implemented as one integrated camera.

An electronic device (e.g., the electronic device 101 of FIG. 1) according to various example embodiments of the disclosure may include: a communication module comprising communication circuitry (e.g., the communication module 190 of FIG. 1), a memory (e.g., the memory 130 of FIG. 1), and a processor (e.g., the processor 120 of FIG. 1) operatively connected to the communication module and the memory, wherein the processor is configured to: control the electronic device to establish a connection to a wearable display device (e.g., the wearable display device 201 of FIG. 2) through the communication module, receive gaze information from the wearable display device, determine a first application and a second application corresponding to the gaze information to be displayed on a screen, identify profiles of the determined first application and second application, and combine graphic data corresponding to the first application and graphic data corresponding to the second application and transmit the combined data to the wearable display device, or transmit each of graphic data corresponding to the first application and graphic data corresponding to the second application to the wearable display device, based on the identified profiles.

Based on one of the first application and the second application corresponding to an application requiring additional data processing to display an application execution screen, the processor may be configured to control the communication module to transmit each of first graphic data corresponding to the first application and second graphic data corresponding to the second application.

Based on the first graphic data requiring additional data processing and the second graphic data requiring no additional data processing, the processor may be configured to: preprocess the second graphic data and transmit the preprocessed second graphic data to the wearable display device, and perform preprocessing and additional data processing for the first graphic data and transmit the preprocessed and additionally processed first graphic data to the wearable display device.

The processor may be configured to: perform preprocessing and additional data processing for the first graphic data while preprocessing the second graphic data and transmitting the preprocessed second graphic data to the wearable display device, and transmit the first graphic data for which the preprocessing and the additional data processing have been performed to the wearable display device.

The processor may be configured to: preprocess the second graphic data and transmit the preprocessed second graphic data through a first communication channel, and perform preprocessing and additional data processing for the first graphic data and transmit the preprocessed and additionally processed first graphic data through a second communication channel different from the first communication channel.

Based on one part of the first graphic data requiring additional data processing and another part of the first graphic data requiring no additional data processing, the processor is configured to: combine and preprocess the second graphic data and the another part of the first graphic data and transmit the combined data to the wearable display device, and perform preprocessing and additional data processing for the one part of the first graphic data and transmit the additionally processed one part of the first graphic data to the wearable display device.

Based on the first application and the second application corresponding to applications requiring no additional data processing, the processor may be configured to combine and preprocess first graphic data corresponding to the first application and second graphic data corresponding to the second application and transmit the combined and preprocessed first and second graphic data.

The profile may include at least one of a priority, protection or non-protection indication, or a category.

Based on one of the first application and the second application corresponding to an application requiring additional data processing, according to one of the priority, the protection or non-protection indication, or the category, the processor may be configured to control the communication module to transmit each of first graphic data corresponding to the first application and second graphic data corresponding to the second application.

The processor may be configured to divide a communication channel based on a priority of each application.

An electronic device (e.g., the wearable display device 201 of FIG. 2) according to various example embodiments of the disclosure may include: a communication module comprising communication circuitry (e.g., the communication module 190 of FIG. 1), a memory (e.g., the memory 130 of FIG. 1), a display module comprising a display (e.g., the display module 160 of FIG. 1), and a processor (e.g., the processor 120 of FIG. 1) operatively connected to the communication module, the memory, and the display module, wherein the processor is configured to: control the electronic device to establish a connection to an external electronic device (e.g., the electronic device 101 of FIG. 1) through the communication module, track a gaze, control the electronic device to transmit the tracked gaze information to the external electronic device, control the electronic device to receive first graphic data corresponding to a first application and second graphic data corresponding to a second application from the external electronic device, control the display module to display the first graphic data on the display module, and perform additional data processing for the second graphic data and display the additionally processed second graphic data on the display module.

Based on the first graphic data requiring no additional data processing, and the second graphic data requiring additional data processing, the processor may be configured to: preprocess the first graphic data and display the preprocessed first graphic data on the display module, and perform preprocessing and additional data processing for the second graphic data and display the preprocessed and additionally processed second graphic data on the display module.

The processor may be configured to perform preprocessing and additional data processing for the second graphic data while preprocessing the first graphic data and displaying the same on the display module, and display the second graphic data for which the preprocessing and the additional data processing have been performed, on the display module.

Figure 4:
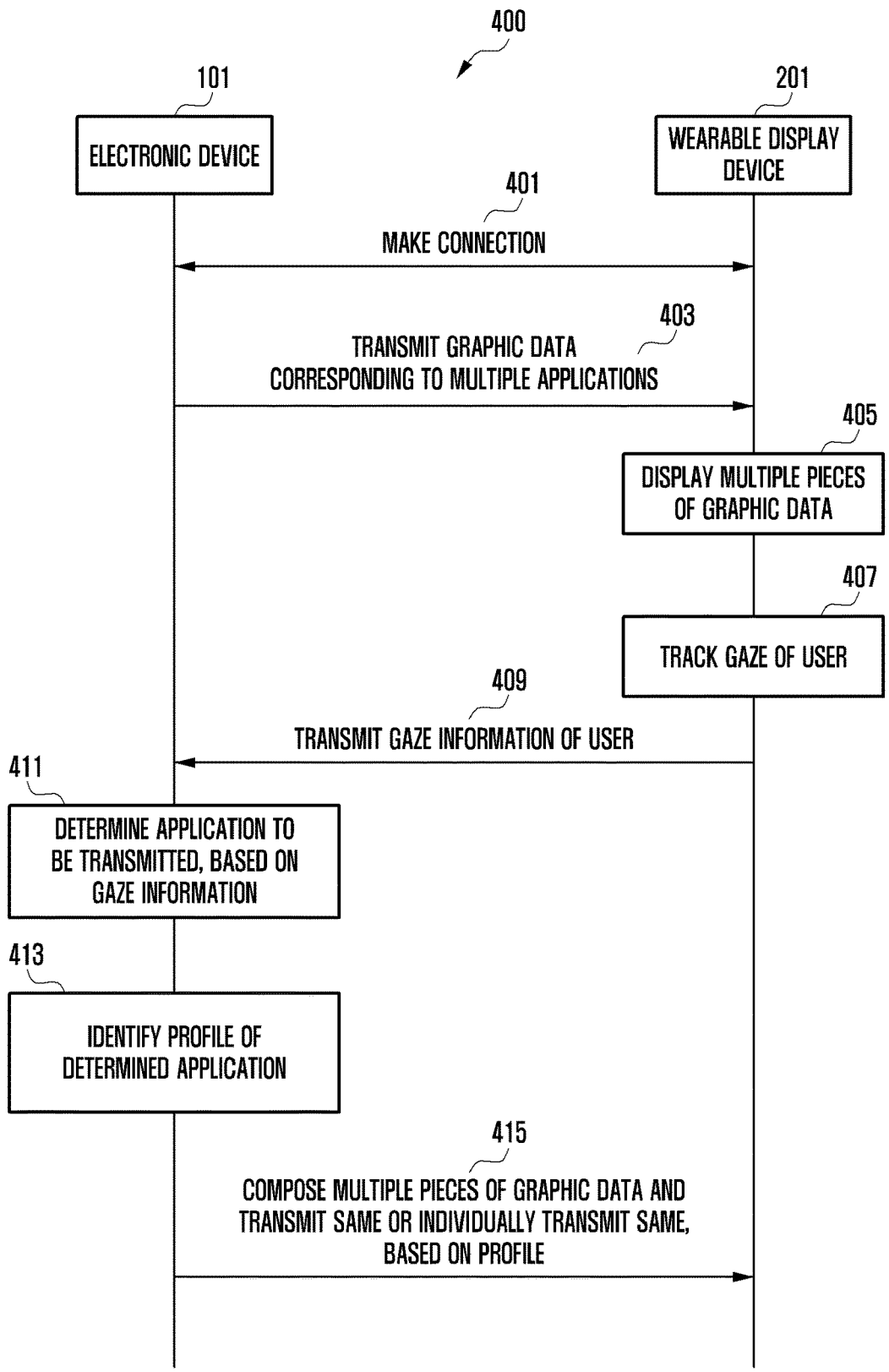
FIG. 4 is a signal flow diagram illustrating an example operation method between an electronic device and a wearable display device according to various embodiments.

FIG. 4 is a signal flow diagram 400 illustrating an example operation method between an electronic device and a wearable display device according to various embodiments.

Referring to FIG. 4, in operation 401, an electronic device (e.g., the electronic device 101 of FIG. 1) according to various embodiments may be connected to a wearable display device (e.g., the wearable display device 201 of FIG. 2). The electronic device 101 and the wearable display device 201 may be wiredly connected to each other or wirelessly paired with each other. For example, the electronic device 101 may be connected to the wearable display device 201 through short-range wireless communication such as Bluetooth, low-power Bluetooth, Wi-Fi, Wi-Fi direct, or a UWB. According to various embodiments, the electronic device 101 may include a smartphone, a tablet PC, and/or a laptop computer. The wearable display device 201 may include AR glasses, smart glasses, or a head-mounted device. When the wearable display device 201 is connected to the electronic device 101, the wearable display device 201 may provide (e.g., transmit) at least one piece of information such as image information, gaze information, device information, sensing information, functional information, and/or location information, to the electronic device 101. The user may wear the wearable display device 201 when being connected to the electronic device 101.

In operation 403, the electronic device 101 may transmit graphic data corresponding to multiple applications to the wearable display device 201. For example, based on a user input, the electronic device 101 may transmit first graphic data (e.g., an execution screen of a first application) corresponding to the first application (e.g., a message application), second graphic data (e.g., an execution screen of a second application) corresponding to the second application (e.g., a game application), and third graphic data (e.g., an execution screen of a third application) corresponding to the third application (e.g., a video reproducing application) to the wearable display device 201. The first graphic data to the third graphic data are related to applications, each of which executed in the electronic device 101, but may be displayed on a display (e.g., the display module 160 of FIG. 1) of the electronic device 101 in the form of a multi-window. The first graphic data to the third graphic data may be simultaneously transmitted to the wearable display device 201, or each of the first graphic data to the third graphic data may be transmitted to the wearable display device 201.

According to various embodiments, the wearable display device 201 displays graphic data, based on the gaze of the user, and may display more information than that displayed on the display module 160 of the electronic device 101. Accordingly, the user may execute the first application in the electronic device 101 to transmit the first graphic data corresponding to the first application to the wearable display device 201, execute the second application to transmit the second graphic data corresponding to the second application to the wearable display device 201, and execute the third application to transmit the third graphic data corresponding to the third application to the wearable display device 201. When the user input corresponds to a preconfigured input (e.g., a specific gesture or a selection of a specific button), the electronic device 101 may transmit graphic data corresponding to all or some of the applications being executed in the electronic device 101, to the wearable display device 201. All or some of the applications being executed in the electronic device 101 may include an application that is currently displayed on the display module 160 of the electronic device 101 and an application that is not displayed on the display module 160 of the electronic device 101 but is executed in the background.

In operation 405, the wearable display device 201 may display multiple graphic data pieces corresponding to the multiple applications on a display (e.g., the first display module 351 and the second display module 353 of FIG. 3). For example, when the first graphic data to the third graphic data are received, the wearable display device 201 may display at least one of the first graphic data to the third graphic data, based on the gaze of the user. For example, based on the gaze of the user, the wearable display device 201 may display one of the first graphic data to the third graphic data, may display the first graphic data and the second graphic data, the second graphic data and the third graphic data, or the first graphic data and the third graphic data, or may display the first graphic data to the third graphic data.

In operation 407, the wearable display device 201 may track the gaze of the user. The wearable display device 201 may track movements of the left eye and the right eye of the user using an eye tracking camera (e.g., the eye tracking camera 313). According to an embodiment, the wearable display device 201 may identify the gaze direction of the left eye and the gaze direction of the right eye using the eye tracking camera 313. For example, the eye tracking camera 313 may include a first eye tracking camera (not shown) for identifying the gaze direction of the left eye and a second eye tracking camera (not shown) for identifying the gaze direction of the right eye.

In operation 409, the wearable display device 201 may transmit gaze information of the user to the electronic device 101. The gaze information may refer, for example, to a field of view (FOV) or an angle of view (AOV), and may include the gaze information of the left eye and the gaze information of the right eye. In FIG. 4, operation 405 may be performed first and then operation 409 may be performed later, but operations 405, 407, and 409 may be simultaneously performed. This is just for assisting in understanding of the disclosure, and the disclosure is not limited to the description.

In operation 411, the electronic device 101 may determine an application to be transmitted, based on the gaze information. While multiple graphic data pieces corresponding to multiple applications are provided through the wearable display device 201, the electronic device 101 may update graphic data of an application according to the gaze information of the user and transmit the same. For example, the electronic device 101 may determine the first application (e.g., the message application) and third application (e.g., the video reproducing application) as an application to be transmitted, based on the gaze information. The gaze of the user of the wearable display device 201 may be currently oriented toward the first application and the third application.

In operation 413, the electronic device 101 may identify a profile of the determined application. The profile of the application may be configured by an application developer, and may include, for example, at least one of a priority, protection or non-protection indication, or a category. The priority of the application may be divided into "high" (or 3), "medium" (or 2), and "low" (or 1). When the priority is "high", individual transmission may be possible, when the priority is "medium", composite or individual transmission may be possible, and when the priority is "low", only composite transmission may be possible. The protection or non-protection indication of the application may be divided into "true" (or 0) and "false" (or 1). When the protection or non-protection indication corresponds to "true", individual transmission may be possible, and when the protection or non-protection indication corresponds to "false", only composite transmission may be possible. For example, when no protection or non-protection indication is configured by the developer of the application, the protection or non-protection indication may be configured as "false". A category of the application may include at least one of a phone call, social, an SNS, a video, a game, an audio, navigation, a map, Internet, or finance. When the category is configured as "finance", individual transmission may be possible, and composite transmission or individual transmission may be possible for the other categories.

In operation 415, based on the profile of the application, the electronic device 101 may compose the multiple graphic data pieces and transmit the same to the wearable display device 201 or may transmit each of the multiple graphic data pieces. The electronic device 101 may identify (or determine) whether graphic data corresponding to an application requires additional data processing, based on the profile of the application. For example, when the priority of the first application is "2", the protection or non-protection indication corresponds to "false", and the category corresponds to "social", the electronic device 101 may determine that no additional processing is required for the first application. When the priority of the third application corresponds to "3", the protection or non-protection indication corresponds to "true", and the category corresponds to "video", the electronic device 101 may determine that additional data processing is required for the third application. In this case, the electronic device 101 may transmit each of the first graphic data and the third graphic data without composition.

For example, the electronic device 101 may preprocess the first graphic data and then transmit the same, and may perform preprocessing and additional data processing for the third graphic data to transmit the same. The electronic device 101 may perform preprocessing and additional data processing for the third graphic data while preprocessing and transmitting the first graphic data, and may transmit the third graphic data as soon as the preprocessing and the additional data processing for the third graphic data are completed. In this case, the wearable display device 201 may process the graphic data according to the sequence of receiving the graphic data to display the first graphic data first and then display the third graphic data. The wearable display device 201 may depacketize and decode (e.g., preprocess) the first graphic data and display the same, and may depacketize the third graphic data, perform additional data processing and decoding, and then display the same.

According to various embodiments, the electronic device 101 may classify communication channels into a communication channel (e.g., a composite transmission communication channel) for transmitting the first graphic data for which the additional data processing is not performed and a communication channel (e.g., an individual transmission communication channel) for transmitting the third graphic data for which the additional data processing is performed. The individual transmission communication channel may have a faster speed and a stable bandwidth, compared to the composite transmission communication channel, and may correspond to the activation of a retransmission process due to a transmission failure. Alternatively, the composite transmission communication channel may have a UDP-based transmission protocol, a wider (or variable) transmission bandwidth, a medium transmission tread priority, and may correspond to the deactivation of a retransmission process due to a transmission failure.

The disclosure can minimize and/or reduce a graphic data display delay of the wearable display device 201, compared to a case in which the third graphic data requires additional data processing like in the conventional manner, the first graphic data is not transmitted while preprocessing and additional data processing are performed for the third graphic data, and the first graphic data and the third graphic data are composed as one and transmitted once the preprocessing and the additional data processing for the third graphic data are completed.

According to various embodiments, when the priority of the first application is "2", the protection or non-protection indication corresponds to "false", and the category corresponds to "social", the electronic device 101 may determine that no additional data processing is required for the first application. When the priority of the third application is "2", the protection or non-protection indication corresponds to "false", and the category corresponds to "video", the electronic device 101 may determine that no additional data processing is required for the third application. In this case, the electronic device 101 may compose the first graphic data and the third graphic data as one and transmit the same. The wearable display device 201 may receive the first graphic data and the third graphic data to depacketize and decode the same, and may display the first graphic data and the third graphic data.

Figure 5:
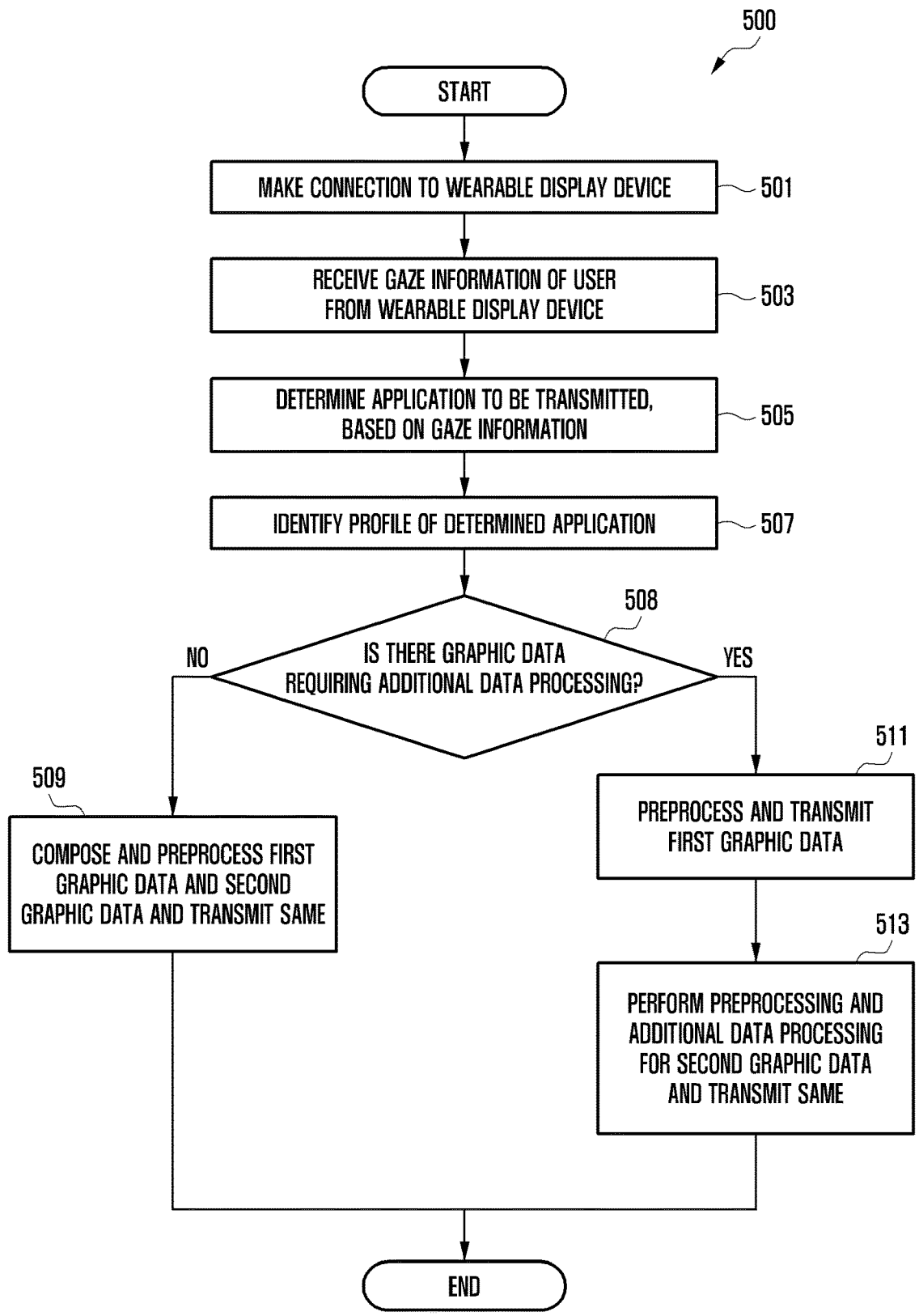
FIG. 5 is a flowchart illustrating an example method of operating an electronic device according to various embodiments.

FIG. 5 is a flowchart 500 illustrating an example method of operating an electronic device according to various embodiments.

Referring to FIG. 5, in operation 501, a processor (e.g., the processor 120 of FIG. 1) of an electronic device (e.g., the electronic device 101 of FIG. 1) according to various embodiments may be connected to a wearable display device (e.g., the wearable display device 201 of FIG. 2). The electronic device 101 and the wearable display device 201 may be wiredly connected to each other or wirelessly paired with each other. For example, the electronic device 101 may be connected to the wearable display device 201 through short-range wireless communication such as Bluetooth, low-power Bluetooth, Wi-Fi, Wi-Fi direct, or a UWB. According to various embodiments, the electronic device 101 may include a smartphone, a tablet PC, and/or a laptop computer. The wearable display device 201 may include AR glasses, smart glasses, or a head-mounted device. When the wearable display device 201 is connected to the electronic device 101, the wearable display device 201 may provide (e.g., transmit) at least one piece of information such as image information, gaze information, device information, sensing information, functional information, and/or location information, to the electronic device 101. The user may wear the wearable display device 201 when being connected to the electronic device 101.

In operation 503, the processor 120 may receive (or acquire) gaze information of a user from the wearable display device 201. The wearable display device 201 may track movements of the left eye and the right eye of the user using an eye tracking camera (e.g., the eye tracking camera 313 of FIG. 3). According to an embodiment, the wearable display device 201 may identify the gaze direction of the left eye and the gaze direction of right eye using the eye tracking camera 313. For example, the eye tracking camera 313 may include a first eye tracking camera (not shown) for identifying the gaze direction of the left eye and a second eye tracking camera (not shown) for identifying the gaze direction of the right eye. The wearable display device 201 may transmit gaze information of the user to the electronic device 101. The gaze information may refer, for example, to a field of view (FOV) or an angle of view (AOV), and may include the gaze information of the left eye and the gaze information of the right eye.

In operation 505, the processor 120 may determine an application to be transmitted, based on the gaze information. While multiple graphic data pieces corresponding to multiple applications are provided through the wearable display device 201, the processor 120 may update graphic data of an application according to the gaze information of the user and transmit the same. For example, the wearable display device

201 may provide an augmented reality image including first graphic data corresponding to a first application, second graphic data corresponding to a second application, or third graphic data corresponding to a third application. Among the multiple pieces of graphic data included in the augmented reality image, the processor 120 may determine the first application (e.g., the message application) and the second application (e.g., the video reproducing application) as applications to be transmitted, based on the gaze information. The gaze of the user of the wearable display device 201 may be currently oriented toward the first application and the second application.

In operation 507, the processor 120 may identify a profile of the determined application. The profile of the application may be configured by an application developer, and may include, for example, at least one of a priority, protection or non-protection indication, or a category. The priority of the application may be divided into "high" (or 3), "medium" (or 2), and "low" (or 1). When the priority is "high", individual transmission may be possible, when the priority is "medium", composite or individual transmission may be possible, and when the priority is "low", only composite transmission may be possible. The protection or non-protection indication of the application may be divided into "true" (or 0) and "false" (or 1). When the protection or non-protection indication corresponds to "true", individual transmission may be possible, and when the protection or non-protection indication corresponds to "false", only composite transmission may be possible. For example, when no protection or non-protection indication is configured by the developer of the application, the protection or non-protection indication may be configured as "false". A category of the application may include at least one of a phone call, social, an SNS, a video, a game, an audio, navigation, a map, Internet, or finance. When the category is configured as "finance", individual transmission may be possible, and composite transmission or individual transmission may be possible for the other categories.

In operation 508, the processor 120 may determine whether the graphic data corresponding to the application to be transmitted includes graphic data requiring additional data processing. For example, when the priority of the first application is "2", the protection or non-protection indication corresponds to "false", and the category corresponds to "social", and when the priority of the second application corresponds to "2", the protection or non-protection indication corresponds to "false", the category corresponds to "video", the processor 120 may determine that no additional data processing is required for the first application and the second application. In this case, the processor 120 may determine that there is no graphic data requiring additional data processing ("No" in operation 508), and may perform operation 509.

When the priority of the first application is "2", the protection or non-protection indication corresponds to "false", the category corresponds to "social", and when the priority of the second application is "3", the protection or non-protection indication corresponds to "true", and the category corresponds to "video", the processor 120 may determine that no additional data processing is required for the first application and may determine that additional data processing is required for the second application. In this case, the processor 120 may determine that there is graphic data requiring additional data processing ("Yes" in operation 508, and may perform operation 511.

When there is no graphic data requiring additional data processing, the processor 120 may compose and preprocess first graphic data and second graphic data and transmit the same in operation 509. The processor 120 may compose the first graphic data and the second graphic data as one, and preprocess (e.g., encode and packetize) and transmit the same. The wearable display device 201 may receive and preprocess (e.g., depacketize and decode) the first graphic data and the second graphic data, and may display the first graphic data and the third graphic data. According various embodiments, the processor 120 may transmit the composite graphic data through a composite transmission communication channel. The composite transmission communication channel has a slower speed and a wider (or variable) bandwidth, compared to the individual transmission communication channel, and may correspond to the deactivation of a retransmission process due to a transmission failure. The composite transmission communication channel may have a UDP-based transmission protocol, a wider (or variable) transmission bandwidth, a medium transmission tread priority, and may correspond to the deactivation of a retransmission process due to a transmission failure.

According to various embodiments, the processor 120 may determine a communication channel, based on the priority of the first application corresponding to the first graphic data or the second application corresponding to the second graphic data. When the priority of the first or the second application is "high", the processor 120 may configure a first communication channel which has a UDP-based transmission protocol or a stable transmission bandwidth, or activates a retransmission process in a case of transmission failure. When the priority of the first or the second application is "medium", the processor 120 may configure a second communication channel which has a UDP-based transmission protocol, a variable transmission bandwidth, or a medium transmission thread priority. When the priority of the first or the second application is "low", the processor 120 may configure a third communication channel which has a UDP-based transmission protocol, a high transmission bandwidth, or a top transmission thread priority, or deactivates a retransmission process in a case of transmission failure.

When there is graphic data requiring additional data processing ("Yes" in operation 508), the processor 120 may preprocess and transmit the first graphic data in operation 511. The processor 120 may transmit each of the second graphic data requiring additional data processing and the first graphic data requiring no data processing. The processor 120 may first preprocess (e.g., encode and packetize) the first graphic data requiring no additional data processing and transmit the same. The wearable display device 201 may receive and preprocess (e.g., depacketize and decode) the first graphic data and display the preprocessed first graphic data. The processor 120 may transmit the first graphic data for which no additional data processing is performed, through the composite transmission communication channel. The processor 120 may determine a communication channel, based on the priority of the first application corresponding to the first graphic data.

In operation 513, the processor 120 may perform preprocessing and additional data processing for the second graphic data. The processor 120 may add an identifier in the second graphic data requiring additional data processing and transmit the second graphic data. The identifier may include a head field of a packet. The wearable display device 201 may identify whether the graphic data requires additional data processing, based on the profile of the application. The processor 120 may perform preprocessing and additional data processing (e.g., encoding, encryption, and packetizing)

the second graphic data and transmit the same while preprocessing the first graphic data. While preprocessing and displaying the first graphic data, the wearable display device 201 may receive the second graphic data, perform preprocessing or additional data processing (e.g., depacketizing, decryption, and decoding) for the second graphic data, and display the second graphic data. The processor 120 may transmit the second graphic data, for which additional data processing is performed, through the individual transmission communication channel. The individual transmission communication channel has a faster speed and a stable bandwidth part, compared to the composite transmission communication channel, and may correspond to activation of a retransmission process according to failure in transmission. The processor 120 may determine a communication channel, based on the priority of the second application corresponding to the second graphic data.

Figure 6A:
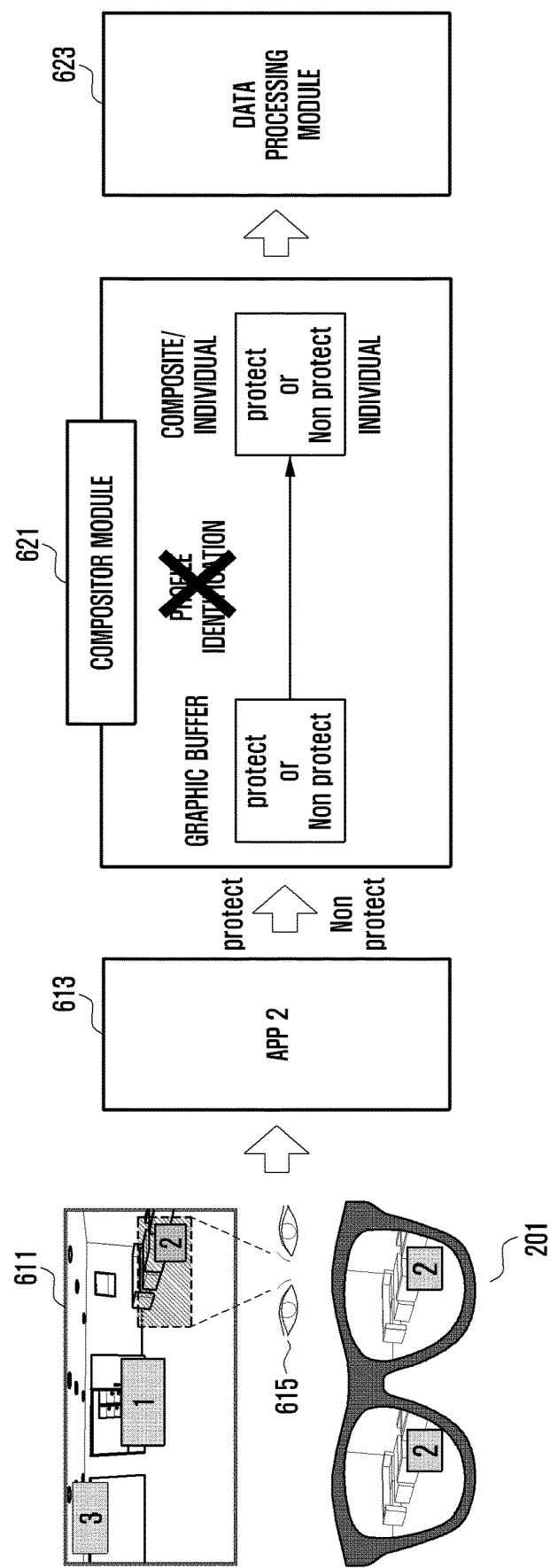
FIGS. 6A, 6B and 6C are diagrams illustrating examples of transmission of graphic data in an electronic device according to various embodiments.
Figure 6B:
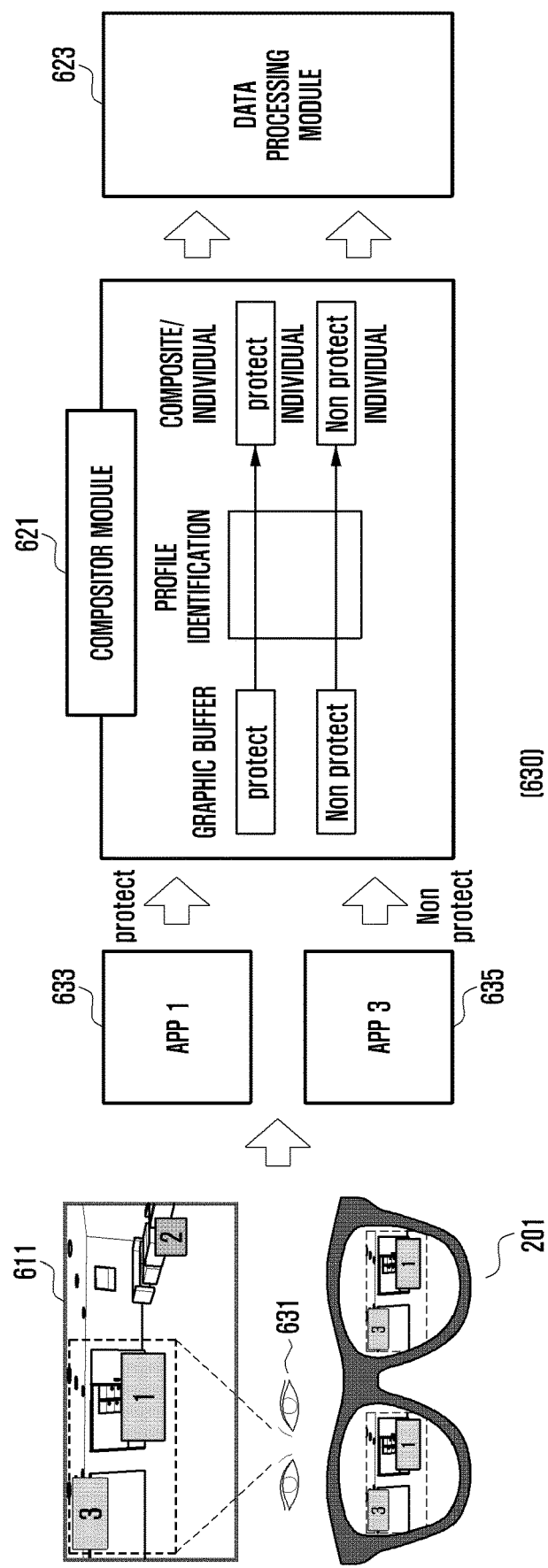
Figure 6C:
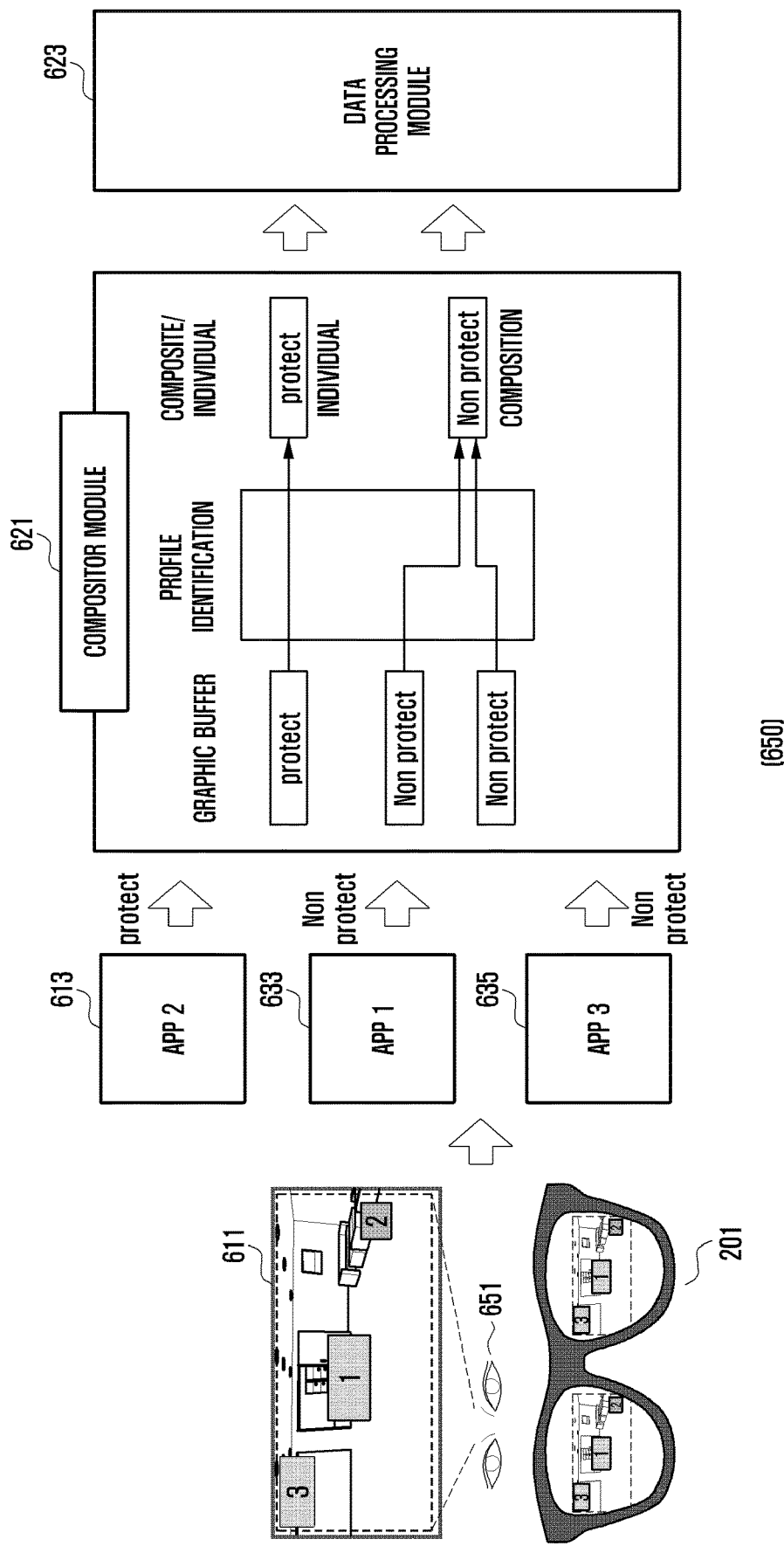

FIGS. 6A, 6B and 6C are diagrams illustrating examples of transmitting graphic data in an electronic device according to various embodiments.

FIG. 6A illustrates an example 610 of transmitting one graphic data piece in an electronic device according to various embodiments.

Referring to FIG. 6A, in a state in which an augmented reality image 611 is provided through a wearable display device (e.g., the wearable display device 201 of FIG. 2), a processor (e.g., the processor 120 of FIG. 1) of an electronic device (e.g., the electronic device of FIG. 1) according to various embodiments may acquire a gaze 615 of a user from the wearable display device 201. The augmented reality image 611 may be graphic data corresponding to multiple applications, provided in an actual space in which a user wearing the wearable display device 201 is positioned, as a virtual object. For example, the augmented reality image 611 may include a first graphic image (e.g., indicated as "1") corresponding to a first application, a second graphic image (e.g., indicated as "2") corresponding to a second application, and a third graphic image (e.g., indicated as "3") corresponding to a third application.

The processor 120 may determine a second application 613 as an application to be displayed, based on the gaze 615 of the user, and may identify a profile of the second application 613. The processor 120 may include a compositor module 621 (e.g., including various processing circuitry and/or executable program instructions) and a data processing module (e.g., including various processing circuitry and/or executable program instructions) 623, wherein the processor 120 may identify the profile of the second application 613 through the compositor module 621 and process (e.g., encode and packetize) second graphic data corresponding to the second application 613 through the data processing module 623. According to various embodiments, when there is one application to be transmitted, the processor 120 may individually transmit the second graphic data corresponding to the second application 613 to the wearable display device 201 without identification of the profile of the application. When there is one application to be transmitted, the processor 120 may individually transmit graphic data without composing the graphic data, and thus the graphic data may be individually transmitted without identification of the profile of the application. In FIG. 6A, the second application 613 may require additional data processing (e.g., protect), or require no additional data processing (e.g., Non protect).

According to various embodiments, the wearable display device 201 may include the compositor module 621 and the data processing module 623. The wearable display device 201 may perform preprocessing or additional data processing for the second graphic data received from the electronic device 101, through the data processing module 623, and may compose the second graphic data into a single frame buffer through the compositor module 621 and display the same.

According to various embodiments, one part of the second graphic data may require additional data processing, and the other part of the second graphic data may require no additional data processing. The processor 120 may divide the second graphic data, and separately transmit a part requiring additional data processing and a part requiring no additional data processing. For example, the processor 120 may transmit the other part of the second graphic data requiring no additional data processing to the wearable display device 201 by encoding and packetizing (e.g., preprocessing) the same, and may transmit the one part of the second graphic data requiring additional data processing to the wearable display device 201 by performing encoding, encryption, and packetizing (e.g., preprocessing and additional data processing) for the same. For graphic data corresponding to one application, the processor 120 may separately transmit an area requiring additional data processing and an area requiring no additional processing.

According to various embodiments, the processor 120 may determine a communication channel, based on the priority of the second application 613. When the priority of the application is "high", the processor 120 may configure a first communication channel which has a UDP-based transmission protocol or a stable transmission bandwidth, or activates a retransmission process in a case of transmission failure. When the priority of the application is "medium", the processor 120 may configure a second communication channel which has a UDP-based transmission protocol, a variable transmission bandwidth, or a medium transmission thread priority. When the priority of the application is "low", the processor 120 may configure a third communication channel which has a UDP-based transmission protocol, a high transmission bandwidth, or a top transmission thread priority, or deactivates a retransmission process in a case of transmission failure.

FIG. 6B illustrates an example 630 of individually transmitting two graphic data pieces in an electronic device according to various embodiments.

Referring to FIG. 6B, in a state in which an augmented reality image 611 is provided through the wearable display device 201, the processor 120 may acquire a gaze 631 of a user from the wearable display device 201. The augmented reality image 611 may include a first graphic image (e.g., indicated as "1") corresponding to a first application, a second graphic image (e.g., indicated as "2") corresponding to a second application, and a third graphic image (e.g., indicated as "3") corresponding to a third application. The processor 120 may determine a first application 633 and a third application 635 as applications to be displayed, based on the gaze 631 of the user, and may identify a profile of each of the first application 633 and the third application 635. According to various embodiments, when the processor 120 is to transmit graphic data corresponding to different applications, the processor 120 may identify a profile of each of the applications.

The processor 120 may identify a first profile of the first application 633 and a third profile of the third application 635 through the compositor module 621. When the first profile requires additional data processing (e.g., protect), the processor 120 may determine to individually transmit the first graphic data corresponding to the first application 633.

When the third profile requires no additional data processing (e.g., Non protect), the processor 120 may determine to perform composite transmission for the third graphic data corresponding to the third application 635. According to various embodiments, when it is determined that the first graphic data is individually transmitted, the processor 120 may determine to individually transmit the third graphic data corresponding to the third application 635, regardless of the third profile of the third application 635. The processor 120 may perform preprocessing or additional data processing (e.g., encoding, encryption, and packetizing) for the first graphic data corresponding to the first application 633 and the third graphic data corresponding to the third application 635, through the data processing module 623.

According to various embodiments, the processor 120 may transmit the third graphic data requiring no additional data processing to the wearable display device 201 by performing encoding and packetizing (e.g., preprocessing) for the same, and may transmit the first graphic data to the wearable display device 201 by performing encoding, encrypting, and packetizing (e.g., preprocessing and additional data processing) for the same. The third graphic data requires no encryption processing, and can thus be transmitted to the wearable display device 201 faster than the first graphic data. While performing additional data processing for the first graphic data, the processor 120 may transmit the third graphic data to the wearable display device 201 by preprocessing the same, and may transmit the first graphic data to the wearable display device 201 when preprocessing and additional data processing of the first graphic data are completed.

According to various embodiments, the wearable display device 201 may include the compositor module 621 and the data processing module 623. The wearable display device 201 may preprocess the first graphic data received from the electronic device 101, and perform preprocessing and additional data processing for the third graphic data, through the data processing module 623, and may compose the first graphic data and the third graphic data through the compositor module 621 and display the same.

According to various embodiments, one part of the first graphic data may require additional data processing, and the other part of the first graphic data may require no additional data processing. The processor 120 may divide the first graphic data, and separately transmit a part requiring additional data processing and a part requiring no additional data processing. For example, the processor 120 may transmit the other part of the first graphic data and the third graphic data requiring no additional data processing to the wearable display device 201 by encoding and packetizing (e.g., preprocessing) the same, and may transmit the one part of the first graphic data requiring additional data processing to the wearable display device 201 by performing encoding, encrypting, and packetizing (e.g., preprocessing and additional data processing) for the same.

According to various embodiments, the processor 120 may control processing priorities, based on the gaze information of the user. For example, as shown in FIG. 6A, when the user gazes the second application 613, the processor 120 may assign a higher processing priority to the second graphic data corresponding to the second application 613, and may assign lower processing priorities to the first graphic data corresponding to the first application 633 and the third graphic data corresponding to the third application 635. When a lower processing priority is assigned to the third graphic data, the processor 120 may transmit the first graphic data and the third graphic data by composing the same even in a case in which additional data processing is required for the third graphic data.

When the gaze direction of the user changes and the user gazes the first application 633 and the third application 635, the processor 120 may assign higher processing priorities to the first graphic data and the third graphic data, and may assign a lower processing priority to the second graphic data. When a higher processing priority is assigned to the third graphic data, the processor 120 may individually transmit the first graphic data and the third graphic data in order to perform additional data processing for the third graphic data.

FIG. 6C illustrates an example 650 of transmitting three graphic data pieces in an electronic device according to various embodiments.

Referring to FIG. 6C, in a state in which the augmented reality image 611 is provided through the wearable display device 201, the processor 120 may acquire a gaze 651 of a user from the wearable display device 201. The processor 120 may determine a first application 633 to a third application 635 as applications to be displayed, based on the gaze 651 of the user, and may identify a profile of each of the first application 633 to the third application 635. According to various embodiments, when the processor 120 is to transmit graphic data corresponding to different applications, the processor 120 may identify a profile of each of the applications.

The processor 120 may identify a first profile of the first application 633, a second profile of the second application 613, and a third profile of the third application 635 through the compositor module 621. When the first profile and the third profile require additional no data processing, the processor 120 may determine to transmit the first graphic data corresponding to the first application 633 and the third graphic data corresponding to the third application 635 by composing the same, and when the second profile requires additional data processing, the processor 120 may determine to individually transmit the second graphic data corresponding to the second application 613.

The processor 120 may compose the first graphic data corresponding to the first application 633 and the third graphic data corresponding to the third application 635 through the compositor module 621, and may preprocess (e.g., encode and packetize) the composite first graphic data and third graphic data and perform preprocessing and additional data processing (e.g., encoding, encryption, and packetizing) for the second graphic data corresponding to the second application 613, through the data processing module 623. According to various embodiments, while performing additional data processing for the second graphic data, the processor 120 may transmit the first graphic data and the third graphic data to the wearable display device 201 by composing and preprocessing the same, and may transmit the second graphic data to the wearable display device 201 when additional data processing of the second graphic data is completed.

Figure 7:
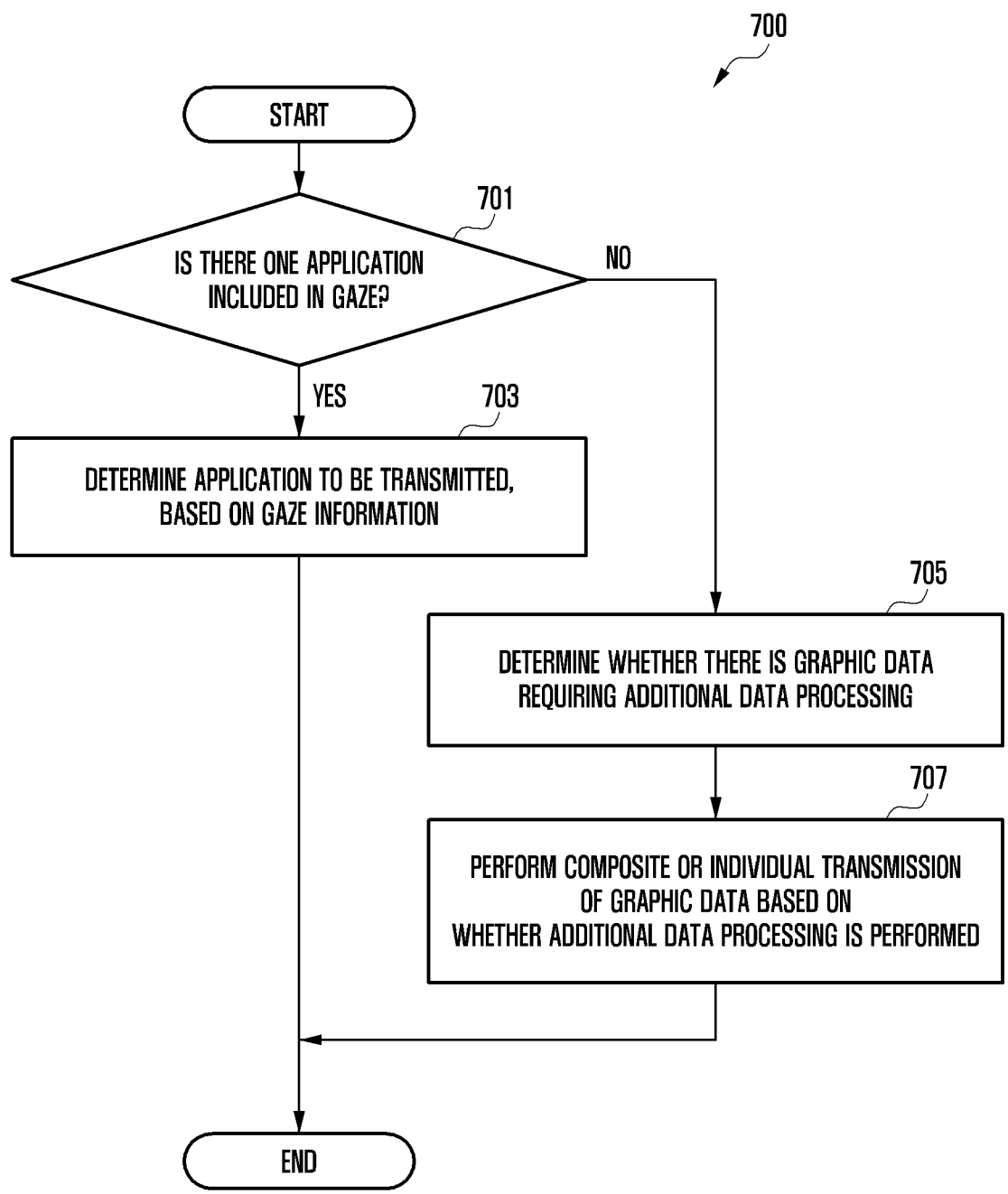
FIG. 7 is a flowchart illustrating an example method for transmitting graphic data, based on a gaze of a user by an electronic device according to various embodiments.

FIG. 7 is a flowchart 700 illustrating an example method for transmitting graphic data, based on a gaze of a user by an electronic device according to various embodiments. FIG. 7 may include operations performed after operation 505 of FIG. 5.

Referring to FIG. 7, in operation 701, a processor (e.g., the processor 120 of FIG. 1) of an electronic device (e.g., the electronic device 101 of FIG. 1) according to various embodiments may determine whether there is one application included in a gaze of a user wearing a wearable display device (e.g., the wearable display device 201 of FIG. 2). For example, as shown in FIG. 6A, when there is one application included in the gaze of the user, the processor 120 may individually transmit graphic data corresponding to the application regardless of a profile of the application. When there is one application included in the gaze of the user ("Yes" in operation 701), the processor 120 may perform operation 703, and when there is not only one application (e.g., when there are two or more applications, "No" in operation 701), the processor 120 may perform operation 705.

When there is one application included in the gaze of the user, the processor 120 may individually transmit graphic data corresponding to the application included in the gaze of the user in operation 703. When there is one application included in the gaze of the user, the processor 120 may individually transmit graphic data corresponding to the application without identification of a profile of the application. According to various embodiments, one part of the graphic data may require additional data processing, and the other part of the graphic data may require no additional data processing. The processor 120 may classify graphic data corresponding to one application into an area requiring additional data processing and an area requiring no additional data processing, and transmit the graphic data. For example, the processor 120 may encode and packetize (e.g., preprocess) the other part of the graphic data requiring no additional data processing and transmit the same to the wearable display device 201, and may perform encoding, encryption, and packetizing (e.g., preprocessing and additional data processing) the one part of the graphic data requiring additional data processing, and transmit the same to the wearable display device 201.

According to various embodiments, the processor 120 may configure a communication channel, based on a priority of the application corresponding to the graphic data, and may transmit the graphic data through the configured communication channel. When the priority of the application is "high", the processor 120 may configure a first communication channel which has a UDP-based transmission protocol or a stable transmission bandwidth, or activates a retransmission process in a case of transmission failure. When the priority of the application is "medium", the processor 120 may configure a second communication channel which has a UDP-based transmission protocol, a variable transmission bandwidth, or a medium transmission thread priority. When the priority of the application is "low", the processor 120 may configure a third communication channel which has a UDP-based transmission protocol, a high transmission bandwidth, or a top transmission thread priority, or deactivates a retransmission process in a case of transmission failure.

When there is not only one application included in the gaze of the user, the processor 120 may determine, in operation 705, whether there is graphic data requiring additional data processing. The processor 120 may determine whether there is graphic data requiring additional data processing, through identification of a profile of the application included in the gaze of the user.

In operation 707, the processor 120 may perform composite or individual transmission of the graphic data, based on whether additional data processing is performed. Among the profiles of applications included in the gaze of the user, when the priority of a first application is "2", the protection or non-protection indication corresponds to "false", and the category corresponds to "social", and when the priority of a second application is "2", the protection or non-protection indication corresponds to "false", and the category corresponds to "video", the processor 120 may determine that no additional data processing is required for the first application and the second application. In this case, the processor 120 may determine that there is no graphic data requiring additional data processing, and may composite and preprocess the first graphic data and the second graphic data to transmit the same to the wearable display device 201.

According to various embodiments, the processor 120 may transmit the composite graphic data through a composite graphic communication channel. The composite transmission communication channel may have a slower speed and a wider (or variable) bandwidth compared to the individual transmission communication channel, and may correspond to deactivation of a retransmission process according the transmission failure. The composite transmission communication channel may have a UDP-based transmission protocol, a wider (or variable) transmission bandwidth, and a medium transmission thread priority, and may correspond to deactivation of a retransmission processor according the transmission failure.

When the priority of the first application is "2", the protection or non-protection indication corresponds to "false", and the category corresponds to "social", and when the priority of the second application is "3", the protection or non-protection indication corresponds to "true", and the category corresponds to "video", the processor 120 may determine that the first application requires additional data processing, and the second application requires no additional data processing. In this case, the processor 120 may first transmit the graphic data requiring no additional data processing, and process additional data processing for the graphic data requiring additional data processing and transmit the same to the wearable display device 201. While preprocessing and transmitting the first graphic data requiring no additional data processing, the processor 120 may perform preprocessing and additional data processing (e.g., encoding, encryption, and packetizing) for the second graphic data and transmit the same.

According to various embodiments, the processor 120 may transmit the first graphic data for which no additional data processing has been performed and the second graphic data for which the additional data processing has been performed, through different communication channels. For example, the processor 120 may transmit the first graphic data for which no additional data processing has been performed, through the composite transmission channel, and may transmit the second graphic data for which additional data processing has been performed, through the individual transmission communication channel. The individual transmission communication channel may have a faster speed and a stable bandwidth compared to the composite transmission communication channel, and may correspond to activation of a retransmission process according to the transmission failure.

Figure 8:
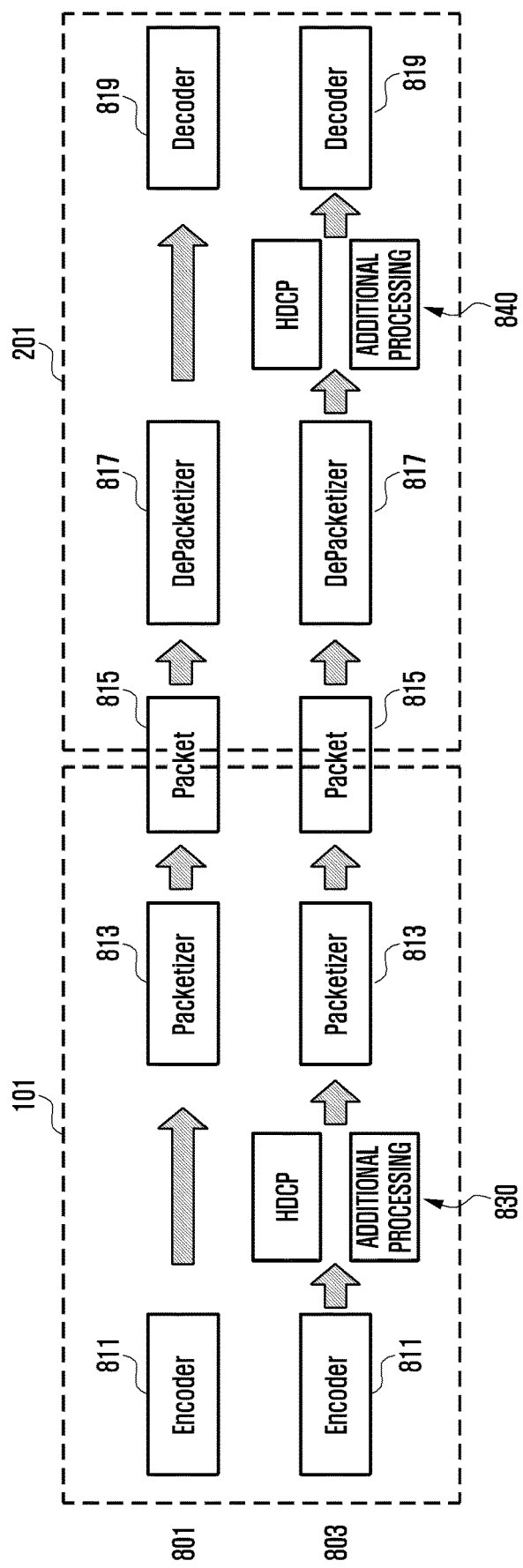
FIG. 8 is a diagram illustrating an example graphic data processing configuration between an electronic device and a wearable display device according to various embodiments.

FIG. 8 is a diagram illustrating an example graphic data processing configuration between an electronic device and a wearable display device according to various embodiments.

Referring to FIG. 8, an electronic device (e.g., the electronic device 101 of FIG. 1) according to various embodiments may include an encoder 811, a packetizer 813, or an additional data processing module 830. The encoder 811, the packetizer 813, or the additional data processing module 830 may be included in the data processing module 623 of FIGS. 6A, 6B and 6C. The electronic device 101 may divide graphic data into first graphic data 801 requiring no additional data processing and second graphic data 803 requiring additional data processing and transmit the same. As a result of identification of a profile of a first application corresponding to the first graphic data 801, the first graphic data 801 may correspond to a case (e.g., Non protect) in which no data processing is required. The electronic device 101 may encode the first graphic data 801 through the encoder 811 and generate a packet 815 through the packetizer 813, and may transmit the same to a wearable display device (e.g., the wearable display device 201 of FIG. 2). The electronic device 101 may only perform preprocessing (e.g., encoding and packetizing) for the first graphic data 801 and may transmit the same to the wearable display device 201.

The wearable display device 201 according to various embodiments may include a depacketizer 817, a decoder 819, or an additional data processing module 840. The wearable display device 201 may individually receive the first graphic data 801 requiring no additional data processing and the second graphic data 803 requiring additional data processing. The wearable display device 201 may receive a packet 815, depacketize the packet 815 through the depacketizer 817, and decode the packet 815 through the decoder 819, so as to display the same. The wearable display device 201 may perform only preprocessing (e.g., depacketizing and decoding) for the first graphic data 801 and display the same. For the first graphic data 801, an encryption process (e.g., the additional data processing module 830) and a decryption process (e.g., the additional data processing module 840) may be skipped, and thus data processing can be promptly processed and a delay can be minimized and/or reduced.

As a result of identification of the profile of second application corresponding to the second graphic data 803, the second graphic data 803 may correspond to a case (e.g., protect) in which data processing is required. The electronic device 101 may encode the second graphic data 803 through the encoder 811, perform additional data processing through the additional data processing module 830, and generate a packet 815 through the packetizer 813, and may transmit the same to the wearable display device 201. The electronic device 101 may perform preprocessing (e.g., encoding and packetizing) and additional data processing (e.g., encryption) for the second graphic data 803, and may transmit the same to the wearable display device 201.

The wearable display device 201 may receive a packet 815, depacketize the packet 815 through the depacketizer 817, perform additional data processing through the additional data processing module 840, perform decoding through the decoder 819, and display the same. The wearable display device 201 may perform preprocessing (e.g., depacketizing and decoding) and additional data processing (e.g., decryption) for the second graphic data 803 and display the same.

When the protection or non-protection indication corresponds to "true", the electronic device 101 and the wearable display device 201 may additionally perform an encryption process (e.g., the additional data processing module 830) and a decryption process (e.g., the additional data processing module 840) in order to protect graphic data. The encryption and decryption processes may increase a processing time but graphic data can be protected. When the first graphic data 801 and the second graphic data 803 are separately transmitted, the first graphic data 801 requiring no additional data processing can be provide with the minimum delay, whereby discomfort due to the delay can be minimized and/or reduced. For the second graphic data 803 requiring additional data processing, which corresponds to graphic data requiring protection, an appropriate data protection process may be added so that the second graphic data 803 can be more stably processed without a load of latency.

Figure 9:
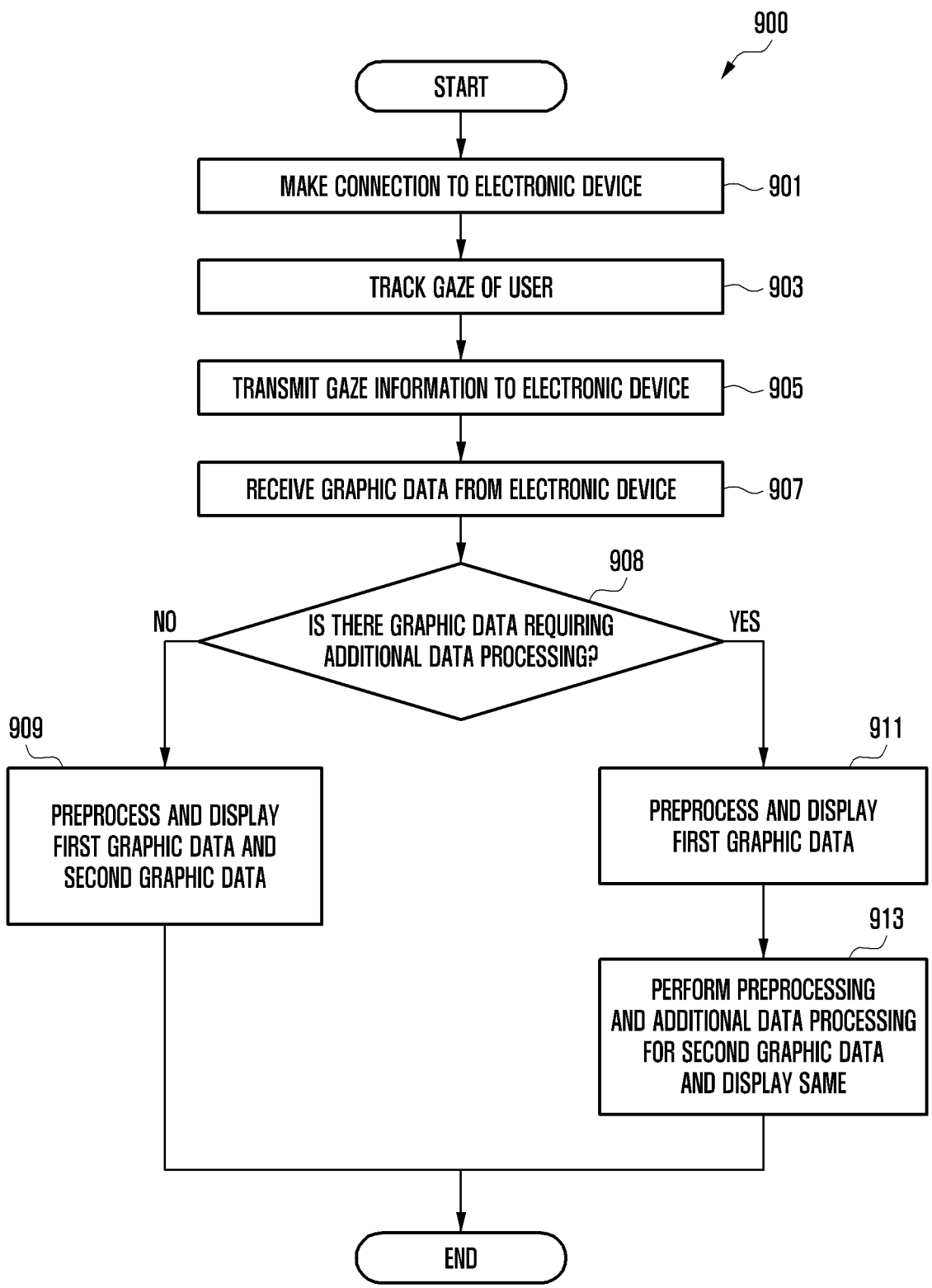
FIG. 9 is a flowchart illustrating an example method for operating a wearable display device according to various embodiments.

FIG. 9 is a flowchart 900 illustrating an example method for operating a wearable display device according to various embodiments.

Referring to FIG. 9, in operation 901, a processor (e.g., the processor 120 of FIG. 1) of a wearable display device (e.g., the wearable display device 201 of FIG. 2) according to various embodiments may be connected to an electronic device (e.g., the electronic device 101 of FIG. 1). The electronic device 101 and the wearable display device 201 may be wiredly connected to each other or wirelessly paired with each other. For example, the electronic device 101 may be connected to the wearable display device 201 through short-range wireless communication such as Bluetooth, low-power Bluetooth, Wi-Fi, Wi-Fi direct, or a UWB. Operation 901 is identical or similar to operation 501 of FIG. 5, and thus detailed description thereof may be omitted.

In operation 903, the processor 120 may track a gaze of a user. The processor 120 may track movements of the left eye and the right eye of the user using an eye tracking camera (e.g., the eye tracking camera 313 of FIG. 3). According to an embodiment, the processor 120 may identify the gaze direction of the left eye and the gaze direction of the right eye using the eye tracking camera 313. For example, the eye tracking camera 313 may include a first eye tracking camera (not shown) for identifying the gaze direction of the left eye and a second eye tracking camera (not shown) for identifying the gaze direction of the right eye.

In operation 905, the processor 120 may transmit the gaze information of the user to the electronic device 101. The gaze information may refer, for example, to a field of view (FOV) or an angle of view (AOV), and may include the gaze information of the left eye and the gaze information of the right eye. The processor 120 may transmit the gaze information of the user to the electronic device 101 in real time, periodically, or selectively.

In operation 907, the processor 120 may receive graphic data from the electronic device 101. The graphic data may correspond to an application included in the gaze information of the user. While providing multiple graphic data pieces corresponding to multiple applications, the processor 120 may receive first graphic data and second graphic data from the electronic device 101. The processor 120 may store the received graphic data in a memory (e.g., the memory 130 of FIG. 1).

In operation 908, the processor 120 may determine whether there is graphic data requiring additional data processing. The processor 120 may identify a head field of a packet to determine whether there is graphic data requiring additional data processing. The processor 120 may identify whether the graphic data requires additional data processing, based on a profile of the application corresponding to the received graphic data. When there is only graphic data requiring no additional data processing, the processor 120 may perform operation 909, and when there is graphic data requiring additional data processing, the processor 120 may perform operation 911.

When there is only graphic data requiring no additional data processing ("No" in operation 908), the processor 120 may preprocess (e.g., depacketize and decode) the first graphic data and the second graphic data and display the same, in operation 909. When there is only graphic data requiring no additional data processing, the first graphic data and the second graphic data may be composed and received as a single packet. The processor 120 may store the packet obtained by composing the first graphic data and the second graphic data in a graphic buffer. The processor 120 may depacketize and decode the packet stored in the graphic buffer to display the first graphic data and the second graphic data through a first display module (e.g., the first display module 351 of FIG. 3) and a second display module (e.g., the second display module 353 of FIG. 3).

When there is graphic data requiring additional data processing ("Yes" in operation 908), the processor 120 may preprocess and display the first graphic data in operation 911. When there is graphic data requiring additional data processing, the first data graphic and the second graphic data may be received through different packets, respectively. The processor 120 may store packets corresponding to graphic data in the graphic buffer according to a receiving sequence. The processor 120 may store a packet corresponding to the first graphic data requiring no additional data processing in the graphic buffer, and may depacketize and decode the packet stored in the graphic buffer, so as to display the first graphic data through the first display module 351 and the second display module 353.

In operation 913, the processor 120 may perform preprocessing and additional data processing (e.g., depacketizing, decryption, and decoding) for the second graphic data and display the same. While displaying the first graphic data, the processor 120 may receive a packet corresponding to the second graphic data requiring additional data processing, from the electronic device 101 and store the same in the graphic buffer, and may depacketize the packet stored in the graphic buffer, perform additional data processing (e.g., decryption) and decoding, and display the second graphic data through the first display module 351 and the second display module 353.

According to various embodiments, the processor 120 of the wearable display device 201 may include a compositor module (e.g., the compositor module 621 of FIGS. 6A to 6C) and a data processing module (e.g., the data processing module 623 of FIGS. 6A to 6C). The data processing module of the wearable display device 201 may perform preprocessing (e.g., depacketizing and decoding) and additional data processing (e.g., decryption), and the compositor module of the wearable display device 201 may finally compose (e.g., combine, arrange or process) one or multiple pieces of graphic data transferred from the data processing module into a single frame buffer. The processor 120 may collect the received graphic data according to a predetermined or specified time interval (e.g., =refresh rate, VSYCN) through the compositor module to configure a frame buffer to be displayed. Each graphic buffer collected in the compositor module may change according to a category of the application corresponding to the graphic data. The processor 120 may configure a frame buffer to be displayed, every predetermined time interval through the compositor module.

Figure 10A:
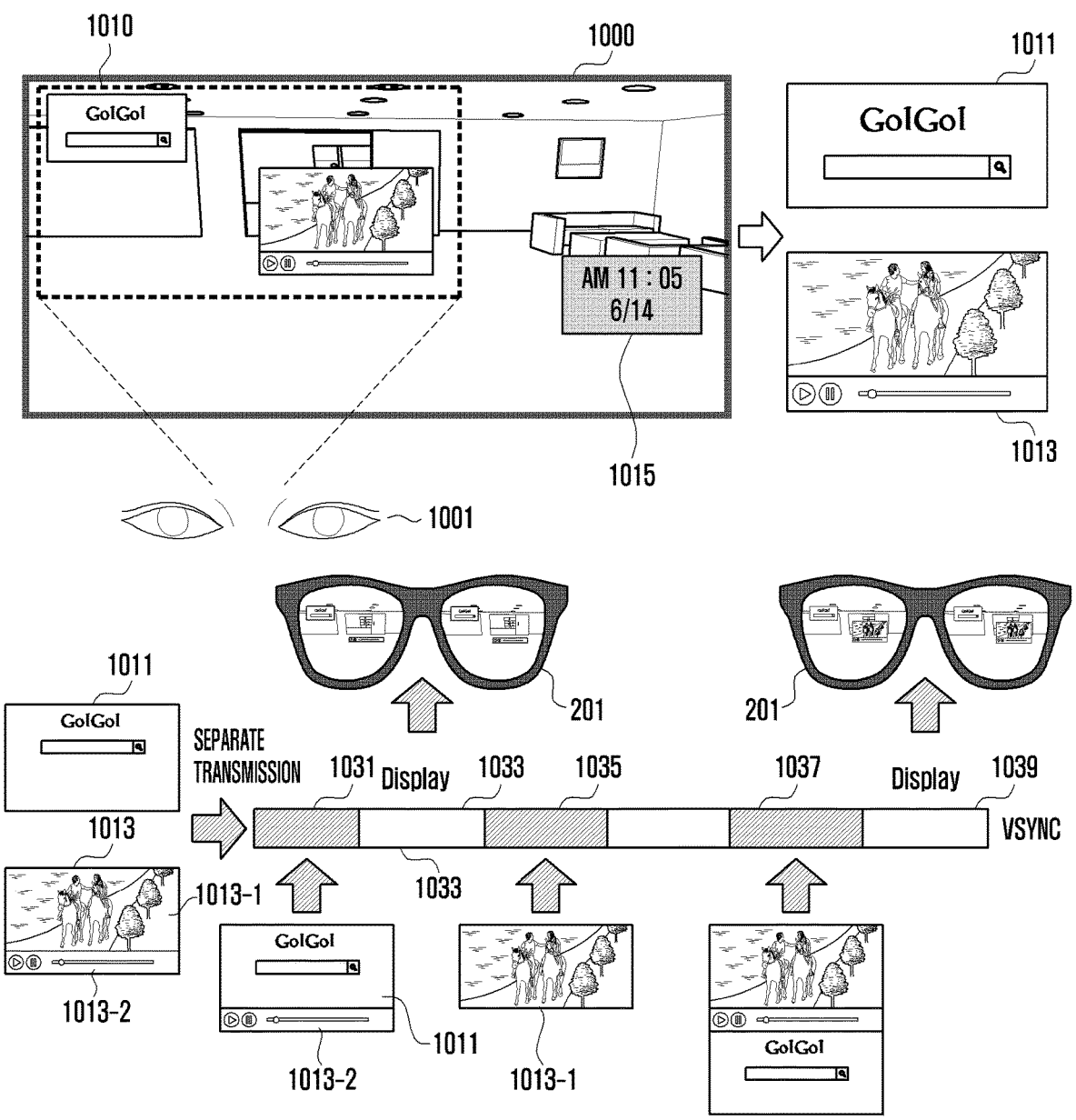
FIGS. 10A and 10B are diagrams illustrating examples of displaying graphic data, based on a gaze of a user by a wearable display device according to various embodiments.
Figure 10B:
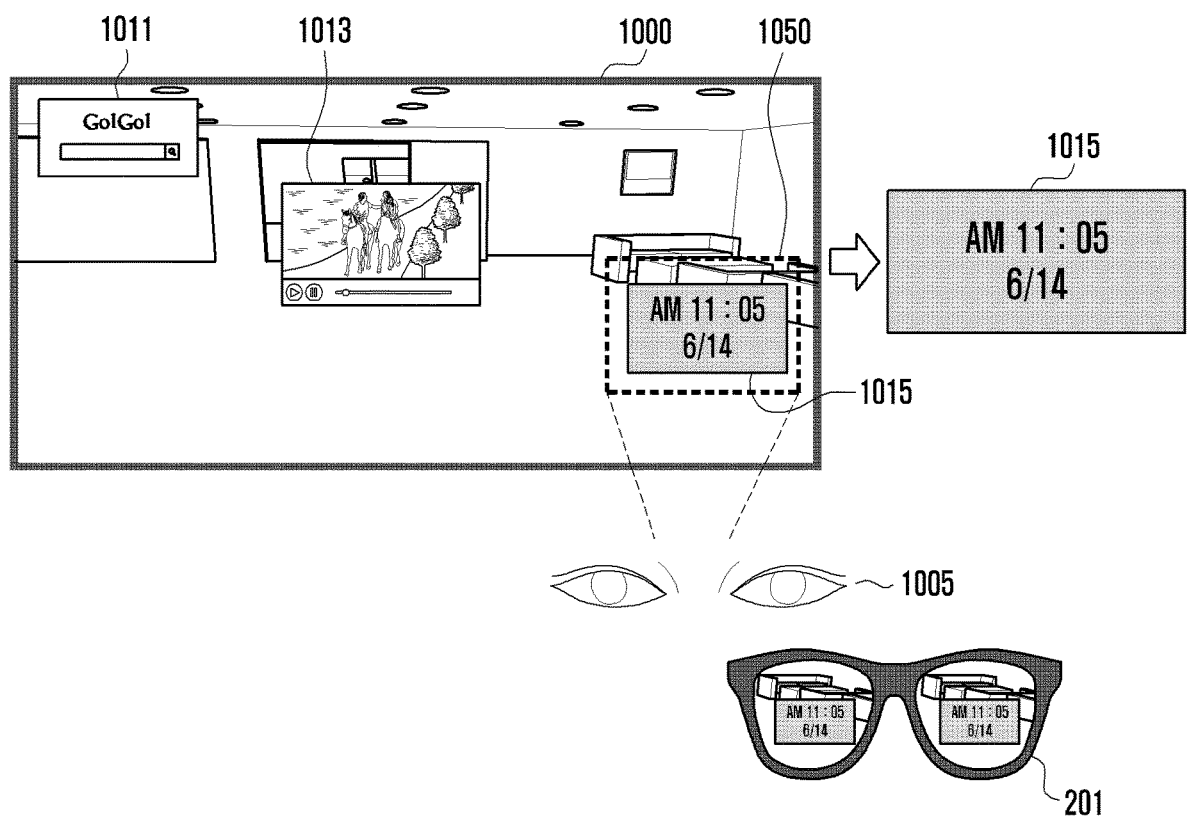

FIGS. 10A and 10B are diagrams illustrating examples of displaying graphic data, based on a gaze of a user by a wearable display device according to various embodiments.

Referring to FIG. 10A, a wearable display device (e.g., the wearable display device 201) according to various embodiments may track a gaze 1001 of a user in a state in which an augmented reality image 1000 is provided. The augmented reality image 1000 may be graphic data corresponding to multiple applications, provided in an actual space in which a user wearing the wearable display device 201 is positioned, as a virtual object. For example, the augmented reality image 1000 may include a first graphic image 1011 (or first graphic data) corresponding to a first application, a second graphic image 1013 corresponding to a second application, and a third graphic image 1015 corresponding to a third application. The wearable display device 201 may determine the display area 1010, based on the gaze 1001 of the user. The display device 201 may transmit information on the gaze 1001 of the user or the display area 1010 to an electronic device (e.g., the electronic device 101).

The electronic device 101 may determine the first application and the second application as applications included in the gaze 1001 of the user. The electronic device 101 may identify a first profile of the first application and a second profile of the second application. The electronic device 101 may determine that the first application requires no additional data processing, based on the first profile. The electronic device 101 may determine that one part (e.g., 1013-1) of the second application requires additional data processing and determine that the other part (e.g., 1013-2) of the second application requires no additional data processing, based on the second profile. The electronic device 101 may transmit graphic data for the second application by dividing the same into a part requiring additional data processing and a part requiring no additional data processing. For example, the electronic device 101 may compose the first graphic data 1011 and the other part 1013-2 and transmit the same, and may perform additional data processing for the one part 1013-1 of the second graphic data and transmit the same.

The wearable display device 201 may collect the received individual or composite graphic data according to a predetermined or specified time interval (e.g., =refresh rate, VSYNC) in a compositor module so as to configure a frame buffer to be displayed. Each graphic buffer collected in the compositor module may change according to a category of an application corresponding to the graphic data. The graphic data collected every predetermined time interval may be omitted from a graphic buffer list. For example, in a case in which the category of an application corresponds to video, a video is to be smoothly provided, and thus a frame buffer can be configured only when predetermined amounts or more graphic data are stored in the graphic buffer. When there is no specific category, the compositor module may configure a frame buffer to be displayed, every predetermined time interval.

The wearable display device 201 may display the first graphic data 1011 and the second graphic data 1013 according to the VSYNC. For example, at a first time point 1031, the wearable display device 201 may first receive the first graphic data 1011 and the other part 1013-2 of the second graphic data and store the same in the graphic buffer. At a second time point 1033, the wearable display device 201 may configure a frame buffer with the first graphic data 1011 and the other part 1013-2 of the second graphic data, which are stored in the graphic buffer, and display the same. At a third time point 1035, the wearable display device 201 may receive the one part 1013-1 of the second graphic data and store the same in the graphic buffer. At a fourth time point 1037, the wearable display device 201 may compose the one part 1013-1 of the second graphic data and the other part 1013-2 of the second graphic data, which are stored in the graphic buffer, and configure one composite piece of the second graphic data 1013 as a frame buffer. Alternatively, at the fourth time point 1037, the wearable display device 201 may configure the first graphic data 1011 and the second graphic data 1013 as a frame buffer. At a fifth time point 1039, the wearable display device 201 may display the first graphic data 1011 and the second graphic data 1013.

Referring to FIG. 10B, the wearable display device 201 may track a gaze 1005 of a user. The wearable display device 201 may determine a display area 1050, based on the gaze 1005 of the user. The wearable display device 201 may transmit information on the gaze 1005 of the user or the display area 1050 to an electronic device (e.g., the electronic device 101 of FIG. 1). When the gaze direction of the user changes to a third graphic image 1015 corresponding to a third application, the processor 120 may assign a higher processing priority to the third application, and assign lower processing priorities to the first graphic data 1011 corresponding to the first application and the second graphic data 1013 corresponding to the second application. When the lower processing priority is assigned to the second graphic data 1013, the processor 120 may compose the first graphic data 1011 and the second graphic data 1013 and transmit the same even when additional data processing is required for the second graphic data 1013. The processor 120 may compose the first graphic data 1011 and the second graphic data 1013 and transmit the same while transmitting the third graphic data 1015.

According to various embodiments, when the gaze of the user changes and the user gazes the first application and the second application, the processor 120 may assign higher processing priorities to the first graphic data 1011 and the second graphic data 1013, and assign a lower processing priority to the third graphic data 1015. When the higher processing priority to the second graphic data 1013, the processor 120 may individually transmit the first graphic data 1011 and the second graphic data 1013 to perform additional data processing for the second graphic data 1013.

Figure 11:
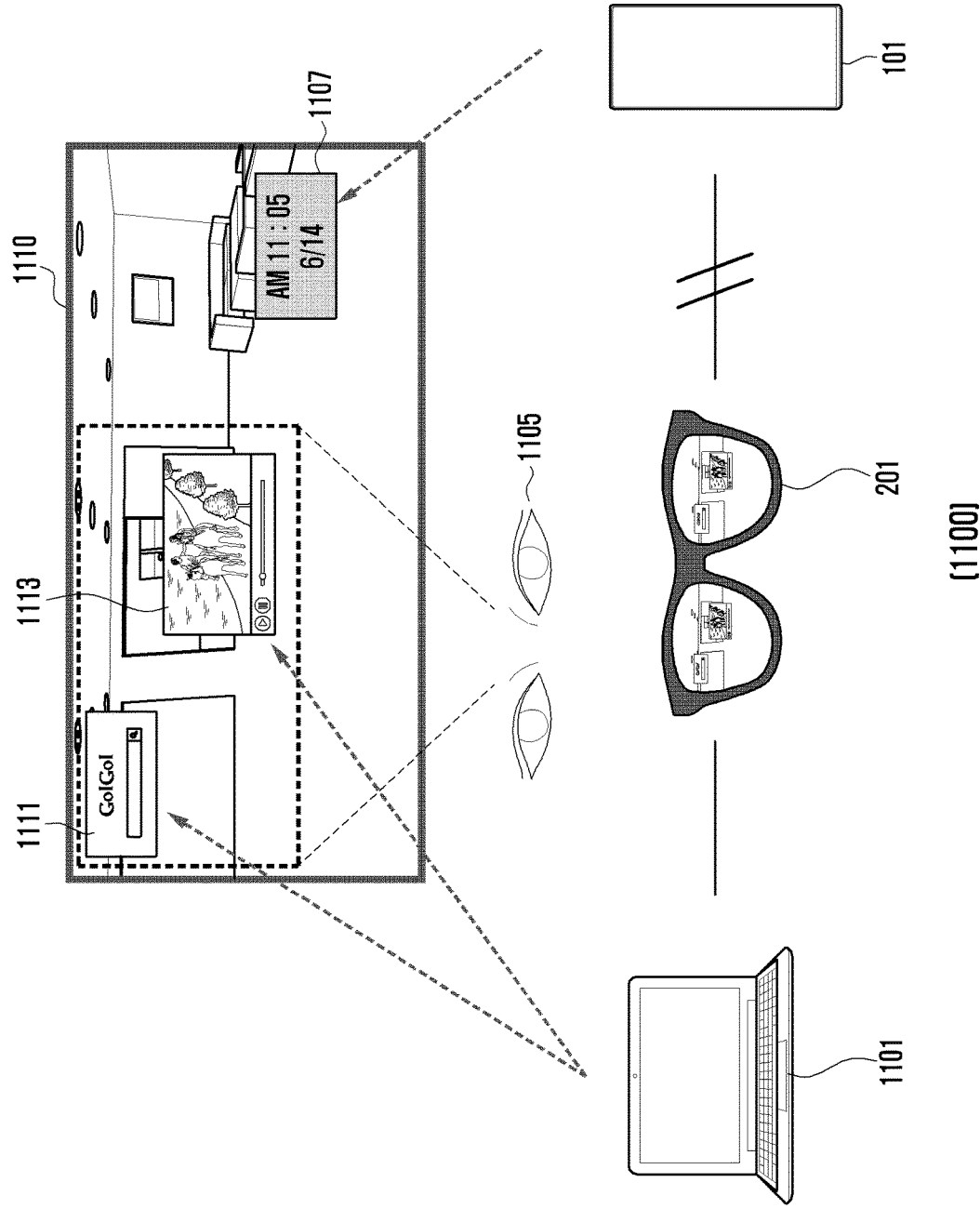
FIG. 11 is a diagram illustrating an example of controlling an external device connected to a wearable display device according to various embodiments.

FIG. 11 is a diagram illustrating an example 1100 of controlling an electronic device connected to a wearable display device according to various embodiments.

Referring to FIG. 11, a wearable display device (e.g., the wearable display device 201 of FIG. 2) according to various embodiments may track a gaze 1105 of a user in a state in which an augmented reality image 1100 is provided. For example, the augmented reality image 1100 may include a first graphic image 1111 corresponding to a first application, a second graphic image 1113 corresponding to a second application, and a third graphic image 1107 corresponding to a third application. The first graphic image 1111 and the second graphic image 1113 may be received from an external device 1101, and the third graphic image 1107 may be received from an electronic device 101.

The wearable display device 201 may control a connection with the external 1101 or the electronic device 101, based on the gaze 1105 of the user. For example, while displaying the first graphic image 1111 and the second graphic image 1113 on a display corresponding to the gaze 1105 of the user, the wearable display device 201 may control a connection with the electronic device 101 which provides the third graphic image 1107 not included in the gaze 1105 of the user, as a sleep mode.

According to various embodiments, transmission data according to transmission of the first graphic image 1111 and the second graphic image 1113 included in the gaze of the user is reduced, and a network with the electronic device 101 which provides the third graphic image 1107 not include in the gaze of the user is temporarily changed to a sleep mode, whereby current consumption can be reduced.

A method of operating an electronic device (e.g., the electronic device 101 of FIG. 1) according to various example embodiments of the disclosure may include: receiving gaze information from a wearable display device in a state of a connection to the wearable display device being made through a communication module (e.g., the communication module 190 of FIG. 1) of the electronic device, determining a first application and a second application corresponding to the gaze information to be displayed on a screen, identifying profiles of the determined first application and second application, and combining graphic data corresponding to the first application and graphic data corresponding to the second application, and transmitting the combined graphic data to the wearable display device, or transmitting each of graphic data corresponding to the first application and graphic data corresponding to the second application to the wearable display device, based on the identified profiles.

The transmitting of each graphic data may include, based on one of the first application and the second application corresponding to an application requiring additional data processing, transmitting each of first graphic data corresponding to the first application and second graphic data corresponding to the second application.

The transmitting of each graphic data may include, based on the first graphic data requiring additional data processing and the second graphic data requiring no additional data processing, preprocessing the second graphic data and transmitting the preprocessed second graphic data to the wearable display device, and performing preprocessing and additional data processing for the first graphic data and transmitting the preprocessed and additionally processed first graphic data to the wearable display device.

The transmitting of each graphic data may include preprocessing the second graphic data and transmitting the preprocessed second graphic data through a first communication channel, and performing preprocessing and additional data processing for the first graphic data and transmitting the preprocessed and additionally processed first graphic data through a second communication channel different from the first communication channel.

The transmitting of each graphic data may include, based on one part of the first graphic data requiring additional data processing and another part of the first graphic data requiring no additional data processing combining and preprocessing the second graphic data and the another part of the first graphic data and transmitting the combined preprocessed second graphic data and another part of the first graphic data to the wearable display device, and performing preprocessing and additional data processing for the one part of the first graphic data and transmitting the preprocessed and additionally processed one part of the first graphic data to the wearable display device.

The profile may include at least one of a priority, protection or non-protection indication, or a category.

The transmitting of each graphic data may include, based on one of the first application and the second application corresponding to an application requiring additional data processing, according to one of the priority, the protection or non-protection indication, or the category, transmitting each of first graphic data corresponding to the first application and second graphic data corresponding to the second application.

Various example embodiments disclosed herein and the drawings are merely examples presented to aid in understanding of the disclosure, and are not intended to limit the scope of the disclosure. Therefore, all changes or modifications derived from the technical idea of the disclosure as well as various embodiments disclosed herein should be understood to fall within the scope of the disclosure. It will also be understood that any of the various embodiment(s) described herein may be used in conjunction with any other embodiment(s) described herein.

What is claimed is:

1. An electronic device comprising:
   a communication module comprising communication circuitry;

a memory; and a processor operatively connected to the communication module and the memory, wherein the processor is configured to:

control the electronic device to establish a connection to a wearable display device through the communication module, receive gaze information from the wearable display device, determine a first application and a second application corresponding to the gaze information to be displayed on a screen, identify profiles of the determined first application and second application, and combine graphic data corresponding to the first application and graphic data corresponding to the second application and transmit the combined graphic data to the wearable display device, or to transmit each of graphic data corresponding to the first application and graphic data corresponding to the second application to the wearable display device, based on the identified profiles.

2. The electronic device of claim 1, wherein based on one of the first application and the second application corresponding to an application requiring additional data processing to display an application execution screen, the processor is configured to transmit each of first graphic data corresponding to the first application and second graphic data corresponding to the second application.

3. The electronic device of claim 2, wherein based on the first graphic data requiring additional data processing and the second graphic data requiring no additional data processing, the processor is configured to preprocess the second graphic data and transmit the preprocessed second graphic data to the wearable display device, and to perform preprocessing and additional data processing for the first graphic data and transmit the preprocessed and additionally processed first graphic data to the wearable display device.

4. The electronic device of claim 3, wherein the processor is configured to perform preprocessing and additional data processing for the first graphic data while preprocessing the second graphic data and transmitting the preprocessed second graphic data to the wearable display device, and to control the electronic device transmit the first graphic data for which the preprocessing and the additional data processing have been performed, to the wearable display device.

5. The electronic device of claim 3, wherein the processor is configured to: preprocess the second graphic data and transmit the preprocessed second graphic data through a first communication channel, and perform preprocessing and additional data processing for the first graphic data and transmit the preprocessed and additionally processed first graphic data through a second communication channel different from the first communication channel.

6. The electronic device of claim 3, wherein based on one part of the first graphic data requiring additional data processing and another part of the first graphic data requiring no additional data processing, the processor is configured to: combine and preprocess the second graphic data and the another part of the first graphic data and transmit the preprocessed second graphic data and the preprocessed another part of the first graphic data to the wearable display device, and perform preprocessing and additional data processing for the one part of the first graphic data and transmit the preprocessed and additionally processed one part of the first graphic data to the wearable display device.

7. The electronic device of claim 1, wherein based on the first application and the second application corresponding to applications requiring no additional data processing, the processor is configured to combine and preprocess first graphic data corresponding to the first application and second graphic data corresponding to the second application and transmit the combined and preprocessed first and second graphic data.

8. The electronic device of claim 1, wherein the profile comprises at least one of a priority, protection or non-protection indication, or a category.

9. The electronic device of claim 8, wherein based on one of the first application and the second application corresponding to an application requiring additional data processing, according to one of the priority, the protection or non-protection indication, or the category, the processor is configured to transmit each of first graphic data corresponding to the first application and second graphic data corresponding to the second application.

10. The electronic device of claim 9, wherein the processor is configured to divide a communication channel based on a priority of each application.

11. A method of operating an electronic device, comprising:

receiving gaze information from a wearable display device in a state of a connection to the wearable display device made through a communication module of the electronic device;

determining a first application and a second application corresponding to the gaze information to be displayed on a screen;

identifying profiles of the determined first application and second application; and combining graphic data corresponding to the first application and graphic data corresponding to the second application and transmitting the combined first and second graphic data to the wearable display device, or transmitting each of graphic data corresponding to the first application and graphic data corresponding to the second application to the wearable display device, based on the identified profiles.

12. The method of claim 11, wherein the transmitting of each graphic data comprises, based on one of the first application and the second application corresponding to an application requiring additional data processing, transmitting each of first graphic data corresponding to the first application and second graphic data corresponding to the second application.

13. The method device of claim 12, wherein the transmitting of each graphic data comprises, based on the first graphic data requiring additional data processing and the second graphic data requiring no additional data processing:

preprocessing the second graphic data and transmitting the preprocessed second graphic data to the wearable display device; and performing preprocessing and additional data processing for the first graphic data and transmitting the preprocessed and additionally processed first graphic data to the wearable display device.

14. The method of claim 13, wherein the transmitting of each graphic data comprises preprocessing the second graphic data and transmitting the preprocessed second graphic data through a first communication channel; and performing preprocessing and additional data processing for the first graphic data and transmitting the preprocessed and additionally processed first graphic data through a second communication channel different from the first communication channel.

15. The method of claim 13, wherein the transmitting of each graphic data comprises, based on one part of the first graphic data requiring additional data processing and another part of the first graphic data requiring no additional data processing:

combining and preprocessing the second graphic data and the another part of the first graphic data and transmitting the combined preprocessed second graphic data and the preprocessed another part of the first graphic data to the wearable display device; and performing preprocessing and additional data processing for the one part of the first graphic data and transmitting the preprocessed and additionally processed one part of the first graphic data to the wearable display device.

* * * * *